United States Patent [19]

Malin

[11] 4,179,740
[45] Dec. 18, 1979

[54] VEHICLE PERFORMANCE ANALYZER

[76] Inventor: John R. Malin, 215 Eastridge La., Escondido, Calif. 92026

[21] Appl. No.: 830,171

[22] Filed: Sep. 2, 1977

[51] Int. Cl.² ........................................... G01M 15/00
[52] U.S. Cl. ..................................... 364/442; 73/1 R; 73/114; 364/424; 364/431
[58] Field of Search ............... 364/442, 424, 431, 565; 235/61 J, 92 FL, 92 MT; 73/113, 114, 1 R, 2

[56] References Cited

U.S. PATENT DOCUMENTS

| 2,992,558 | 7/1961 | Newell et al. | 364/442 X |
| 3,927,305 | 12/1975 | Gruhl | 73/114 X |
| 3,983,372 | 9/1976 | Klaver | 73/114 X |
| 4,031,363 | 6/1977 | Freeman et al. | 73/114 X |
| 4,046,998 | 9/1977 | Kuno et al. | 364/442 X |
| 4,050,295 | 9/1977 | Harvey | 73/114 |
| 4,054,781 | 10/1977 | Kuno et al. | 364/442 |

Primary Examiner—Jospeh F. Ruggiero

Attorney, Agent, or Firm—John E. Wagner

[57] ABSTRACT

A vehicle performance analyzer which determines and displays instantaneous miles-per-hour, miles-per-gallon and miles-to-end-of-tank. The instantaneous outputs are calculated by a microprocessor using a vehicle speed sensor coupled to the drive shaft of the vehicle transmission, a fuel flow sensor introduced in the fuel line between the fuel pump and the carburation system and an analog-to-digital electrical signal converter connected to the electrical fuel gauge. The microprocessor is directed by a resident program contained in read-only memory, which also contains a calibration procedure allowing the person installing the device to accurately calibrate the device to the particular vehicle on which it is installed. This eliminates the need for a variety of special sensors designed to meet the variable needs of different makes and models of vehicles. It also eliminates inaccuracies due to variances in some parameters of different vehicles of identical makes and models.

25 Claims, 21 Drawing Figures

SPEED TRANSDUCER INPUT CIRCUIT

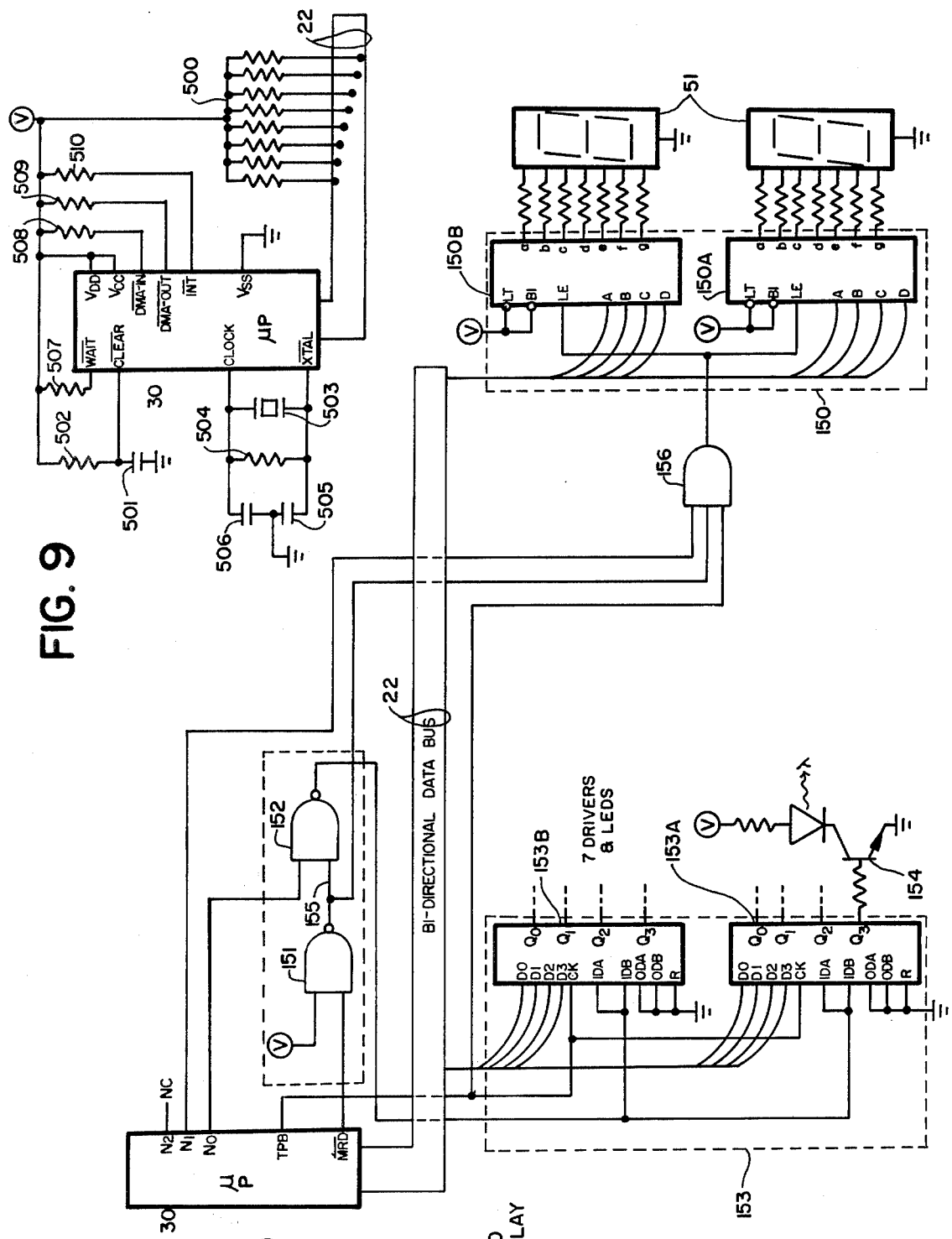

VEHICLE PERFORMANCE ANALYZER

BACKGROUND OF THE INVENTION

The monitoring of automobile performance, particularly gas consumption, has been heretofore approached only from a very perfunctory basis. The typical fuel gauge, when monitored carefully, shows an extremely non-linear relationship between needle movement and fuel use. Inaccuracies occur particularly in the critical low fuel range of 5-10% or more. In the past, because of this limitation, some luxury automobiles have had a feature of an audible and flashing light alarm to indicate when a low fuel condition exists. These systems, which are added to the existing fuel level, have no greater accuracy than the fuel level monitor itself.

In recent years, with the availability of computer techniques and reliable and less expensive computer equipment, a number of systems have been developed for providing somewhat more definitive vehicle performance information. Representative of patents showing such systems are:

U.S. Pat. No. 3,927,305 issued to F. Grehl on 12/16/1975.

Other patents have issued on engine or static engine analysis equipment designed for either factory or garage use but not involving any vehicle while on the road. Such patents are represented by the following:

U.S. Pat. Nos. 3,815,411 R. S. Emerson: 6/11/1974
3,777,559 L. V. Rennick: 12/11/1973
3,630,076 J. E. Staudt: 12/28/1971.

More elaborate engine performance systems designed particularly for aircraft or gas turbine engines are disclosed in the following patents:

U.S. Pat. Nos. 3,958,107 A. C. Edelson et al 5/18/1976
3,750,465 J. S. Howell et al 8/7/1973
3,721,120 J. S. Howell et al 3/20/1973.

Speed control systems involving monitoring of the actual speed and comparing it with the desired speed are shown in a number of patents as represented by:

U.S. Pat. Nos. 3,952,829 L. O. Gray: 4/27/1976
3,878,363 R. G. Terwilliger 4/15/1975.

None of the above recognize the need for actual vehicle performance data including miles-to-end-of-tank with the data actually calibrated to the vehicle.

A non-calibrated digital vehicle performance system is shown in U.S. Pat. No. 3,927,305 to F. Gruhl, issued 12/16/1975, and I understand microprocessors per se have been proposed and possibly employed in vehicles for performance monitoring.

BRIEF DESCRIPTION OF THE INVENTION

Given the foregoing background of the invention, it is the general object of this invention to provide an improved vehicle performance monitoring system.

Another object of this invention is to provide such a system employing a microprocessor which is capable of operation under the adverse environment of an automobile as to temperature, electromagnetic interference, voltage supply variations and the like and still provide accurate information to the user.

Another object of the invention is to provide such a system which accurately furnishes fuel consumption rate and miles-to-the-end-of-fuel information.

A further object of this invention is to provide such a system that is calibrated to the actual vehicle and is easily and reliably recalibrated by the user if such a need exists.

These objects are all achieved employing a combination of a fuel quantity sensor, a fuel flow sensor, a vehicle speed sensor and a microprocessor for storing, processing and displaying the parameters:

(a) miles per hour;
(b) miles per gallon; and
(c) miles to empty tank.

The system also displays calibration information and allows actual calibration and recalibration by the user to match actual vehicle performance. The system includes manual controls for inputting calibration data merely by matching switches to binary displays. This last feature is generally applicable and novel to microprocessors in general and allows an untrained person to program a computer.

BRIEF DESCRIPTION OF THE DRAWINGS

This invention may be more clearly understood from the following detailed description and by reference to the drawings in which:

FIG. 7 is a simplified electrical schematic drawing of a three display mode selection circuit;

FIG. 8 is a simplified electrical schematic drawing of one digit display mode selection circuit;

FIG. 9 is a simplified electrical schematic of the microprocessor timing circuit;

FIG. 10 is a block diagram of a single digit display circuit;

DETAILED DESCRIPTION OF THE INVENTION

Figure 1:
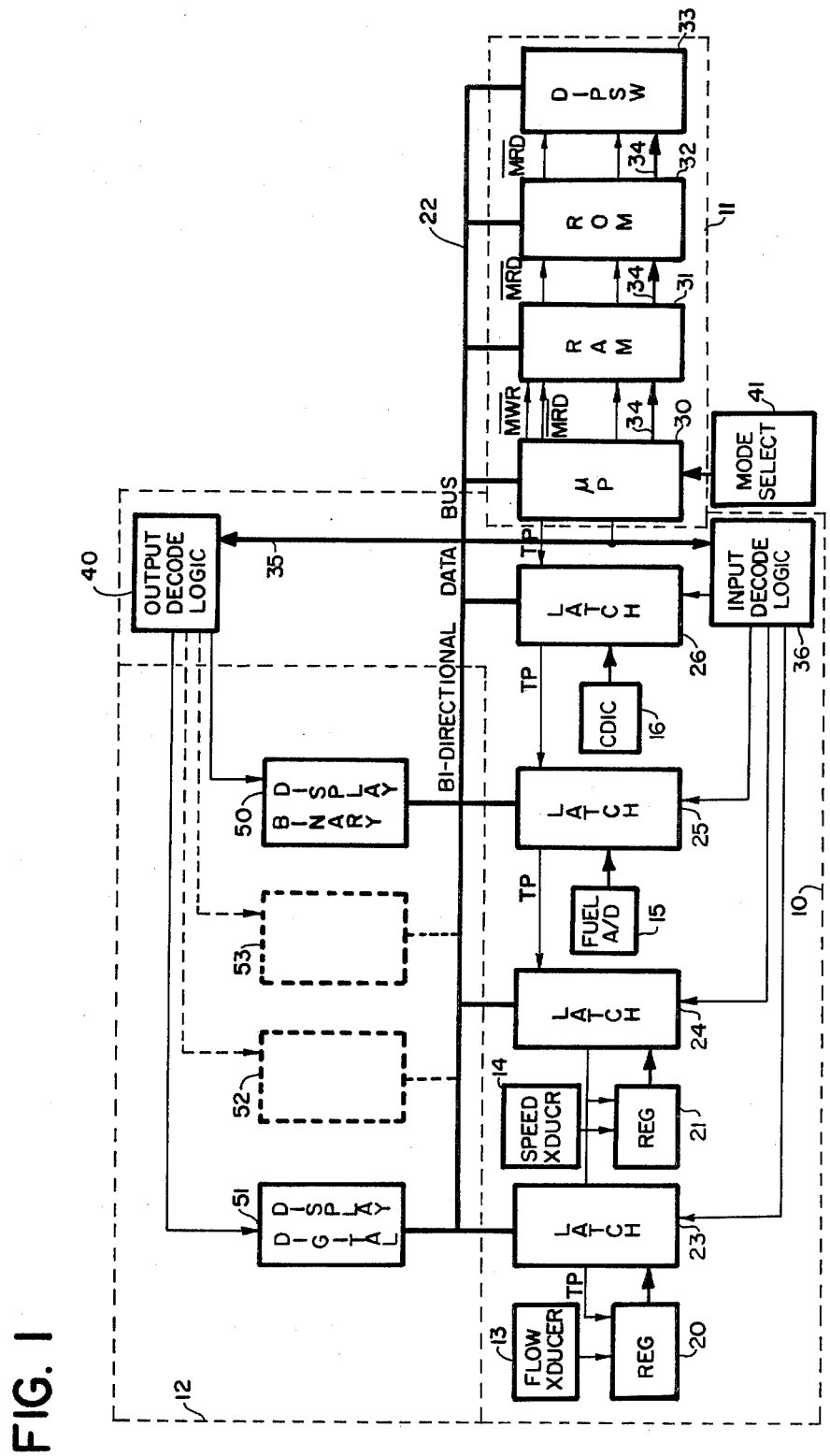
FIG. 1 is a block diagram of my invention.

This invention may be seen in its preferred embodiment in FIG. 1. It comprises basically an input section 10, a data processing section 11 and a display section 12. The input section 10 includes three transducers, a flow sensor 13 in the fuel supply to monitor actual fuel flow to the engine of the vehicle on which the system is installed, a vehicle speed transducer 14 and a fuel gauge monitor and A to D converter 15. The vehicle speed transducer may be a conventional transmission pickup used in automobiles or an improved pickup as described below. The fuel gauge pickup 15 is in effect an analog to digital converter connected to the electrical side of the conventional gasoline gauge of the automobile or other vehicle. These three inputs provide the basic data to determine and describe fuel consumption in miles per gallon, miles till end of tank and speed.

An additional input to the system is the set of manual switches, the calibration Data Input Controls or CDIC 16 through which the user can at any time calibrate or recalibrate the system as described below.

The flow sensor 13 providing data in binary encoded form is stored in register 20 while the vehicle speed transducer 14 has its similar register 21. These registers 20 and 21 accummulate the output of the flow and speed sensors and the A/D converter 15 over a fixed time interval, e.g. 1 second. All of these input data sensors are connected to a common bidirectional data bus 22 via respective input latch circuits 23–26.

The heart of the system is the data processing section 11 comprising a microprocessor 30 having associated therewith a random access memory RAM 31 and a read only memory ROM 32, the latter containing a resident program for control of the microprocessor. The microprocessor 30 provides the basic data processing plus timing pulses TP for the entire system. The microprocessor 30 receives and sends out data through the bidirectional data bus 22, selects memory locations in the RAM 31, reads data from the ROM 32 and reads input data supplied mechanically by a series of dipswitches 33 over an address bus 34. The microprocessor provides memory write pulses $\overline{MWR}$ to the RAM 31 and memory read pulses $\overline{MRD}$ to the RAM 31, ROM 32 and dipswitches 33. The microprocessor also provides commands to the input section 10 and display section 12 via the I/O command bus 35. Input and output commands on the bus 35 are interrupted in respective input or output logic decode circuits 36 and 40. Finally, mode select controls 41 allows the operator to select any of the following modes of operation:

(1.) Single Display as shown in FIG. 10
   (a) calibration mode
   (b) MPH operational mode
   (c) MPG operational mode
   (d) MET operational mode or in the case of:
(2.) Three displays as described in FIG. 11
   (a) calibration mode
   (b) operational mode.

The dip switches 33 are used to introduce calibration data which is displayed in binary form on a binary display 50 forming a part of the display section 12. The readout of data from the system appears on either a single 2 digit display 51 for sequential display of data or alternately simultaneous display on three-two digit displays showing the values in accuracy to units. I have found that in automotive applications, the tenths digit is always rapidly changing from one display update to the next and would be more of a distraction than an aid to accuracy. Therefore, tens and units digits are only read out in all 3 operational modes. In the microprocessor, however, the calculated values are kept internally to tenths and then rounded off for display. The additional displays are shown as dashed boxes 52 and 53 controlled by output decode logic circuit 40 similar to the display 50 and 51. The selection of multiple digital vs. single digital displays is a matter of choice with the factors of cost, size, need for simultaneous display probably controlling.

The preferred embodiment of this invention appears in FIG. 1. It preferably employs a CMOS integrated circuit microprocessor 30 such as the RCA Cosmac CDP1802 chip or equivalent. The microprocessor need not necessarily be a CMOS microprocessor; but is an excellent choice because of the following:

(1) The automobile is a hostile environment for both temperature and electro-magnetic interference, and RCA Cosmac, being a C-MOS device can operate over a wide temperature range, −55 to 125 degrees C. and has high electrical noise immunity: 30% of the power supply voltage;

(2) The Cosmac needs only a single power supply with a wide operational range: 3–12 volts;

(3) Being of C MOS design, the COSMAC type device also has low power dissipation thereby putting minimum loading on the vehicle electrical system;

(4) The preferred chip also has built-in clock circuitry which requires only the connection of an appropriate crystal for operation;

(5) Cost is reasonable;

(6) The instruction set, memory address capability and I/O capability is more then adequate to handle the necessary operations of the vehicle performance analyzer without over capability;

(7) A large variety of support devices are available to interface directly to the Cosmac and thereby limit the number of IC's for the complete device describing the actual preferred circuit.

In describing the actual preferred circuit, I will start with the microprocessor chip 30 and work outward. To contain the resident calibration and operation program, a 512 byte read only memory (ROM) 32 is used. The 512 byte ROM 32 requires 9 address bits to access all locations. Since the microprocessor 30 has an 8 bit address bus which is multiplexed to provide up to 16 bit address bits-the high order byte is outputted on an address bus first and then the low order byte-more than one address byte is needed to address the 512 byte ROM 32 and latching circuitry is needed to hold the high order address byte. The preferred circuit for the ROM 32 is the RCA CDP1831D chip because:

(1) all high order latching circuitry is built in;

(2) chip select inputs are present which allow easy memory expansion if required;

(3) a chip enable output is present which allows connection to the RAM 31 to disable the RAM 31 when the ROM 32 is addressed;

(4) The 1831 type ROM is directly compatable with the Cosmac buses;

(5) It is static and requires no refresh circuitry. Since the easiest way to reset the microprocessor 30 upon power up is to set the program counter to zero, the first 9 address bits will access the ROM 32 when the remaining 7 address bits are zeros. A reset will, therefore, cause the microprocessor to begin running the resident control program.

Since very little external RAM memory space is needed, the RCA CDP 1824D 32 byte RAM is preferred because:

(1) of memory size;

(2) a chip enable is present which allows chip select decoding and/or interconnection to the ROM chip enable output;

(3) It is static thus no refresh circuitry is needed.

The 32 byte RAM 31 requires 5 address bits. If the first 5 bits of the low order address byte are used, no latching of the address bits is necessary. In order to insure that both the RAM and ROM are not activated at the same time, either decoding of higher order bits to select between RAM 31 and ROM 32 is used or the ROM chip enable output is used to disable the RAM 31. A combination of both chip select methods can also be used.

Fifteen dipswitches 33 are used to hold calibration constants and are to be addressed as memory locations. To address 15 locations, 4 address bits are needed. Again, if the first 4 bits of the low order address byte are used, no latching of address bits is necessary. Also, high order address bit decoding can be used to select from among ROM 32, RAM 31 and dipswitches 33. Each dipswitch is one byte in size so a single byte transfer is all that is necessary to transfer dipswitch contents to the microprocessor 30. Each dipswitch 33 then needs a tri-state, byte wide buffer with an addressable enable. To read the address code and select the correct dipswitch buffer enable, a 4 bit to 16 line decoder with an output enable is employed. For each of the possible combinations of the 4 address bits, one of the 16 outputs will be actuated (only 15 will be used) and a particular dipswitch 33 selected. High order bit decoding will be used to enable the decoder outputs when dipswitches 33 are to be selected and disable the decoder when ROM 32 or RAM 31 are selected.

To determine which bits are to be used for addressing and decoding, let us review the above.

For the ROM 32, 9 address bits are needed and at least an additional bit for device select. The RAM 31 needs 5 address bits and at least one additional bit for device select. The dipswitches 33 need 4 address bits and at least one additional bit for device select. It should be noted that the device select bits may be a high order bit of the address bus or a special output from another device.

A preferred method for addressing all memory devices is illustrated in the following decode tables.

The first method of decoding is to use address bits only for both addressing and device selection. This is accomplished by using bits 0 through 8 for addressing and bits 9 and 10 for device selection. The following abbreviations are used in the decode tables:

A-signifies bit is used for addressing
SC-signifies bit is used for device selection
X-signifies bit is unused and state of bit does not matter
1-must be logic "1" for activation
0-must be logic "0" for activation

CENTRAL PROCESSING UNIT

Figure 2:
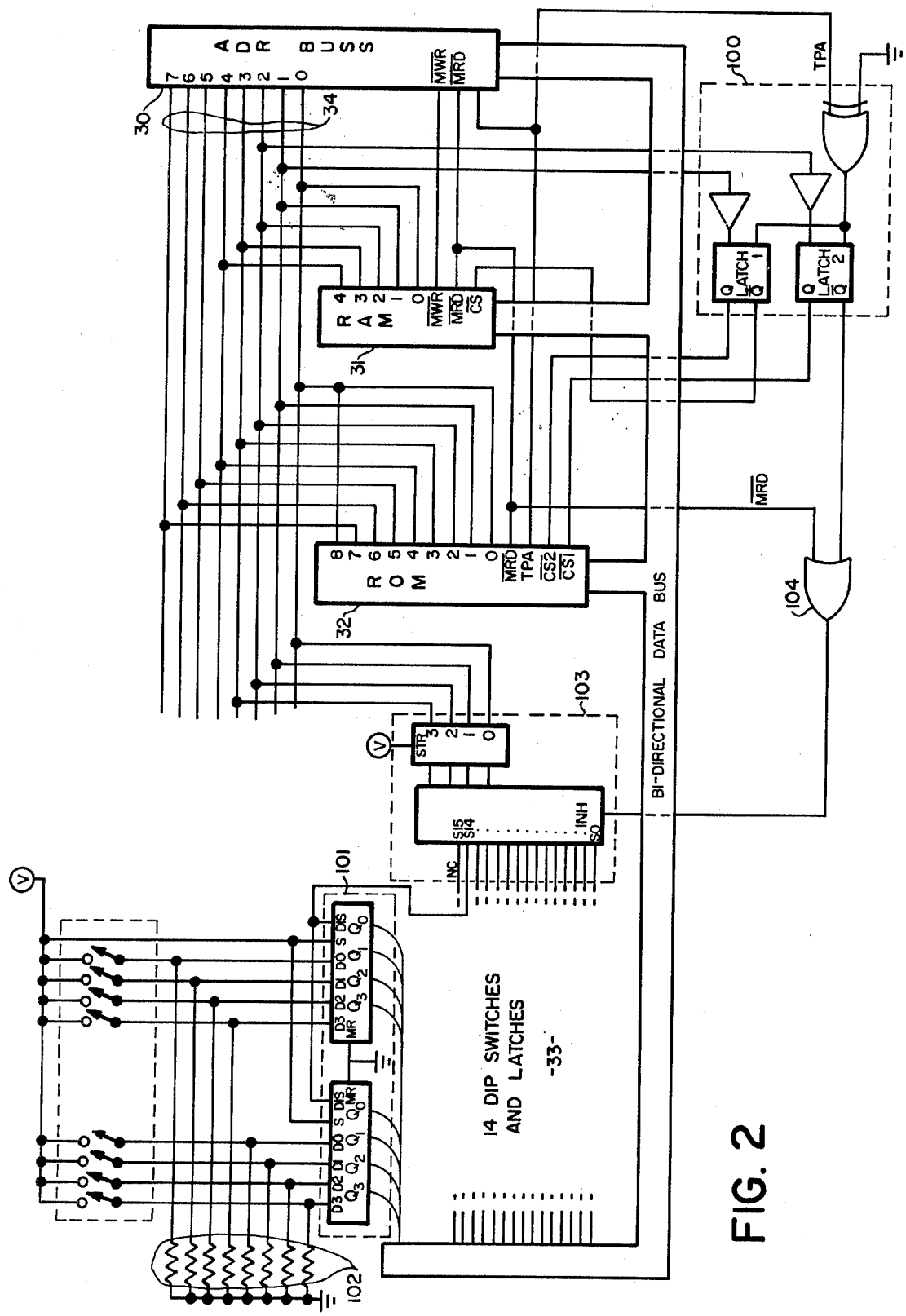
FIG. 2 is a block diagram of the central computer unit of this invention.

Given the foregoing criteria for the central processing unit components, the microprocessor 30, ROM 32, RAM 31 and dip switches 33 the complete wiring diagram for the interconnection of the microprocessor to all memory devices 31, 32, and 33 based on the tables developed above is shown in FIG. 2. One half of a quad latch chip 100 is used to latch the high order bits 9 and 10 for device select decoding with the TPA (timing) pulse generated by the microprocessor 30 to the latches 100. ROM 32 is structured so that it is enabled when inputs $\overline{CS1}$ and $\overline{CS2}$ are both low and disabled otherwise. The ROM 32 contains its own latching for the high order bit 8 gated by timing pulse TPA. ROM 32 is selected by the program counter when it is reset to 0000000000000000 and increments through to: 0000000111111111. The contents of the ROM 32 is gated onto the bi-directional data bus 22 when input read memory $\overline{MRD}$ goes low. The RAM 31 is selected by specifying bit 9 a "1" and bit 10 a "0". This disables ROM 32 and dip switches 33 and enables the RAM 31. Data is gated onto the bi-directional data bus 22 when $\overline{MRD}$ goes low and data is written into the RAM 31 from the bi-directional data bus 22 when write memory $\overline{MWR}$ goes low. The dipswitches 33 store data in binary form by putting an "0" on a latch 101 input when a switch contact is open and pull-down resistors 102 pull the input to ground, and a "1" is placed at the latch 101 input when a switch contact is closed pulling the input to voltage v. The tri-state output is enabled when a low is present at the disable input. A 4 to 16 decoder 103 choses which dipswitch, if any, is gated onto the bi-directional data bus 22 by decoding the address bits into active low outputs. The dipswitches 33 are selected by setting bits 9 and 10 to "0" and "1" respectively. This disables RAM 31 and ROM 32 and provides a low to the inhibit input when $\overline{MRD}$ is also low. When RAM 31 or ROM 32 are selected or $\overline{MRD}$ is high, a high is present at the inhibit input of decoder 103 forcing all outputs of the decoder high. This disables all dipswitches 33. The gate 104 is used to sense $\overline{MRD}$ and device select decoding to provide the correct inhibit signal. Thus, the device select codes are such that when ROM 32 is selected, RAM 31 and dipswitches 33 are always

ROM 32 DECODE TABLE

| | Low Order Byte | | | | | | | | | High Order Byte | | | | | |
|---|---|---|---|---|---|---|---|---|---|---|---|---|---|---|---|
| Address bits | 0 | 1 | 2 | 3 | 4 | 5 | 6 | 7 | 8 | 9 | 10 | 11 | 12 | 13 | 14 | 15 |
| Status | A | A | A | A | A | A | A | A | A | SC-0 | SC-0 | x | x | x | x | x |

RAM 31 DECODE TABLE

| | Low Order Byte | | | | | | | | | High Order Byte | | | | | |
|---|---|---|---|---|---|---|---|---|---|---|---|---|---|---|---|
| Address bits | 0 | 1 | 2 | 3 | 4 | 5 | 6 | 7 | 8 | 9 | 10 | 11 | 12 | 13 | 14 | 15 |
| Status | A | A | A | A | A | x | x | x | x | SC-1 | SC-0 | x | x | x | x | x |

DIPSWITCH ADDRESS TABLE

| | Low Order Byte | | | | | | | | | High Order Byte | | | | | |
|---|---|---|---|---|---|---|---|---|---|---|---|---|---|---|---|
| Address bits | 0 | 1 | 2 | 3 | 4 | 5 | 6 | 7 | 8 | 9 | 10 | 11 | 12 | 13 | 14 | 15 |
| Status | A | A | A | A | x | x | x | x | x | SC-0 | SC-1 | x | x | x | x | x | disabled. When RAM 31 is selected, ROM 32 and dip switches 33 are disabled. Finally, when dipswitches 33 are selected, ROM 32 and RAM 31 are disabled. The device selection circuitry prevents the accidental selection of two memory devices at the same time.

INPUT SUMMARY

To review, the fuel flow transducer 13, transmission pickup 4 and A-to-D input ports 15 each use a pulsed input generated and scaled to be proportional in frequency to the parameter being measured. The accumulation counter, latch and bus drive circuitry is identical for all three. The timing and control circuitry is common for all three. This means that all three parameters are measured at the same time for the same measurement interval under the microprocessor 30 control and stored for later calculation.

At this time, it would be useful to review the input instructions for the microprocessor 30. The following table lists the input instructions and resultant function:

| INPUT INSTRUCTION (HEX) | INPUT FUNCTION |
| --- | --- |
| 69 | flow transducer |
| 6A | transmission pickup |
| 6B | A to D converter |
| 6C | directional code byte |
| 6D | calibration data-high order byte |
| 6E | calibration data-low order byte |

FUEL FLOW SENSING

Figure 5:
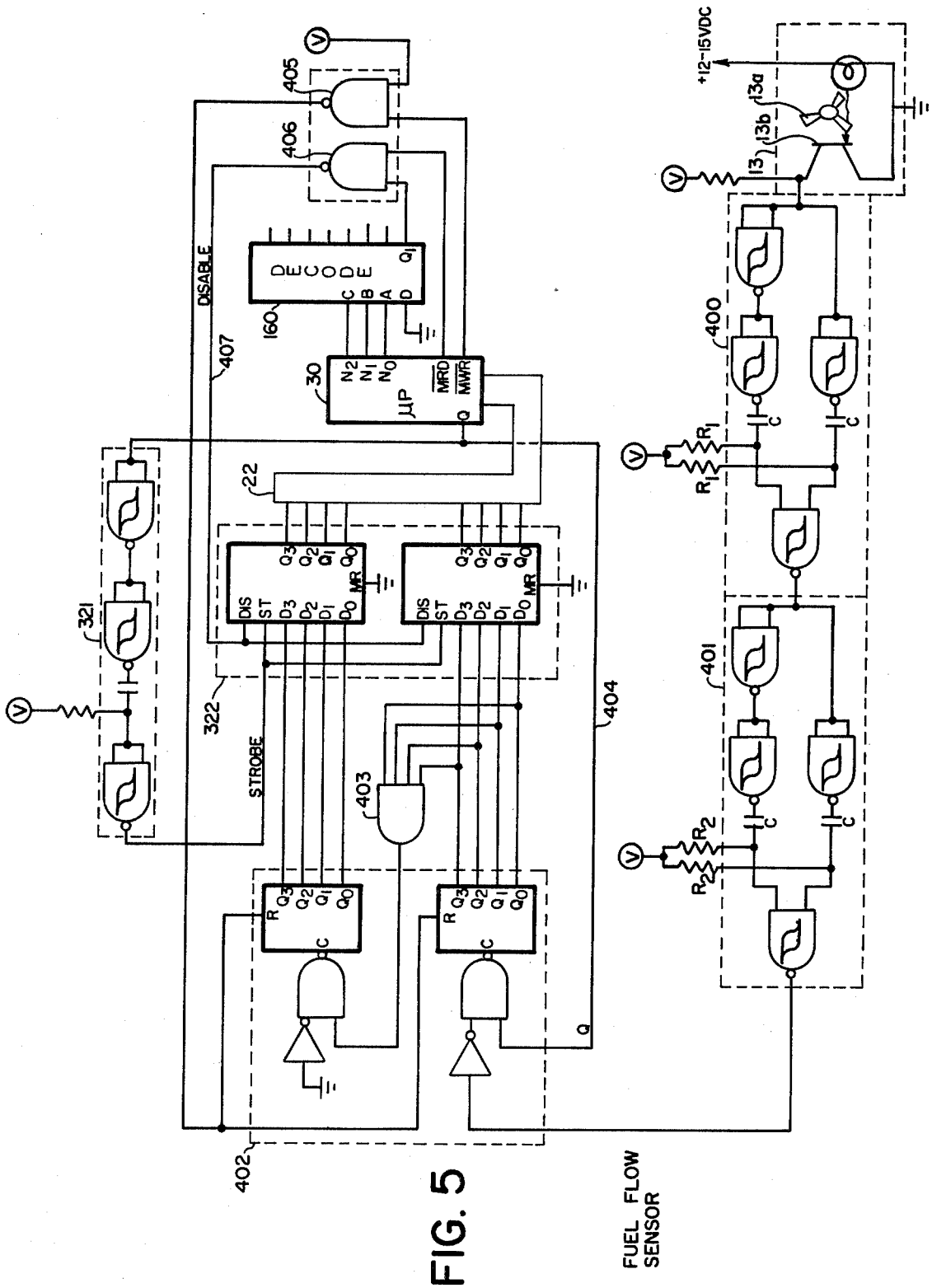
FIG. 5 is a block diagram of the fuel flow monitoring circuit.

The fuel flow transducer 13 preferred is a model 100-A turbine flow transducer manufactured by FloScan Instrument Co., Inc. It has a measurement range of 1.5 to 15 gallons-per-hour, and it uses a 3 blade turbine 13a as shown in FIG. 5 turned by the flowing fuel to cut a light beam shining on a phototransistor 13b to provide a pulsed output proportional to flow rate. The corresponding pulsed output is 6 Hz for 1.5 GPH to 60 Hz for 15 GPH. The output is coupled to a frequency quadrupler formed from 8,2-input schmitt trigger NAND gates 400 and 401. The frequency quadrupler is 2 cascaded dual edge triggered monostable multivibrators. Each dual edge triggered multivibrator provides an output pulse for the positive edge of the input pulse and another output pulse for the negative edge of the input pulse. Thus, for each complete pulse in, 4 pulses are outputted. The value of capacitors C are chosen to be 50 pf to eliminate undue loading of the outputs. Resistances R1 are chosen to be 2.5 meg so the pulse width of the first multivibrator will be 125 microseconds, much less than the minimum input pulse width of 8.3 microseconds. Resistances R2 are chosen as 1 meg so the pulse width of the multivibrator 401 will be 50 microseconds, less than ½ of the pulse width of the multivibrator 400.

The output of the frequency multiplier is fed into the positive clock input of a dual 4-bit binary counter 402. 4-input AND gate 403 is used to generate a carry pulse to cascade the two 4-bit counters 402 to form a single 8-bit binary counter. The frequency multiplier 400-401 was used with the flow transducer to allow full use of an 8-bit counter over shorter time intervals and increase accuracy at low flow rates. The binary counter is gated ON and OFF by the Q output of the microprocessor 30 on lead 404. The counter begins counting when Q goes high and stops when Q goes low. The Q output is set and reset by software programming. The counter interval will be controlled by software and referenced by the microprocessor 30 clock. The reset pulse is generated by inverting the $\overline{MWR}$ output in gate 405. After the count of the counter 402 has been transferred to the bi-directional data bus 22, it is entered into RAM 31, hence $\overline{MWR}$ pulses low to write the data into RAM 31. The inverted $\overline{MWR}$ pulse simultaneously resets the counter 402.

A dual 4-bit latch 322 is again used an an input port. The output of the binary counter 402 is fed directly to the latch 322 inputs. A monostable multivibrator is made from 3,2-input schmitt trigger Nand gates 321, which provide the strobe pulse to latch the counter output into the latch when the Q output goes low stopping the counter 402 at the end of its count interval.

Figure 4:
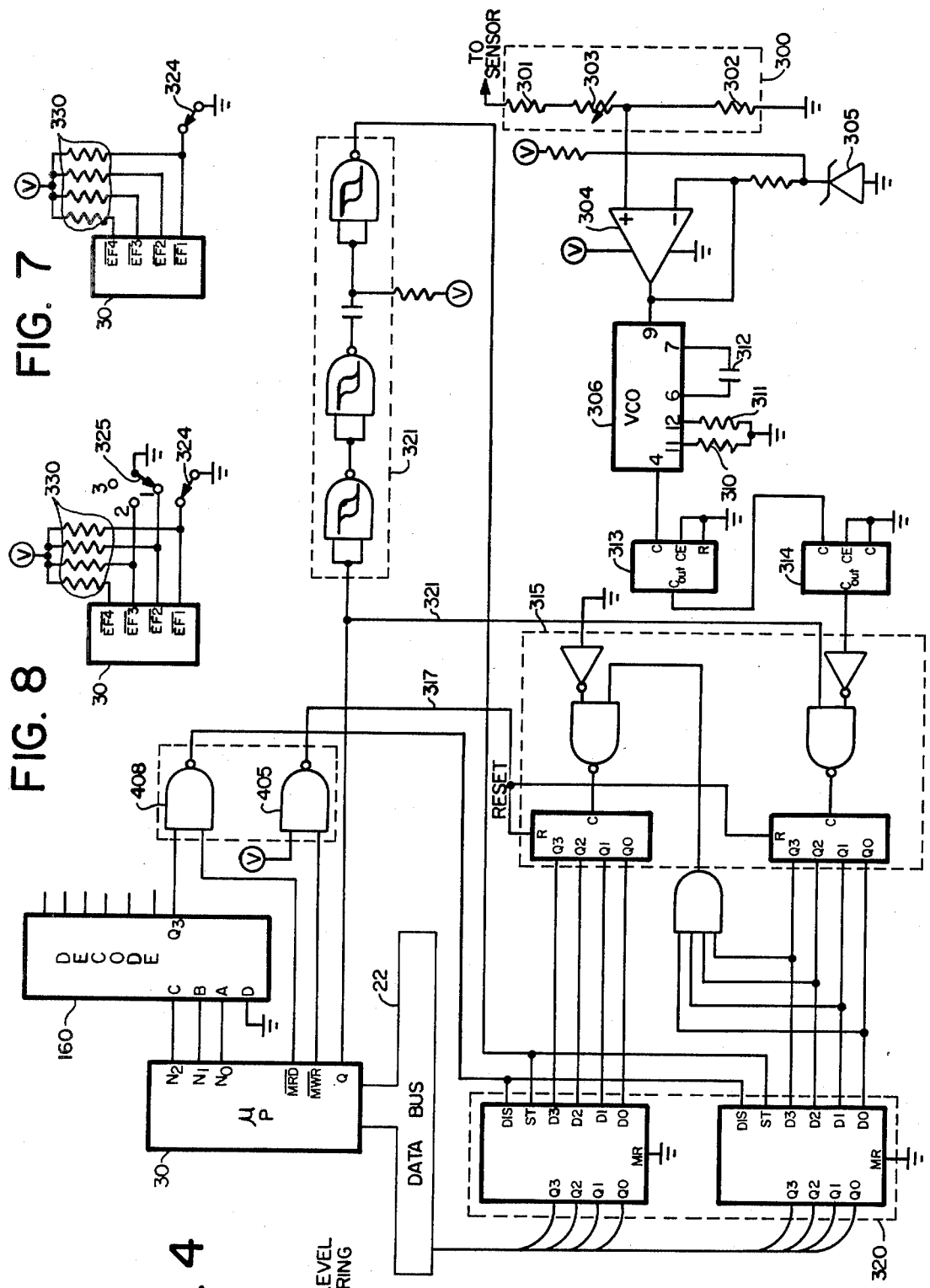
FIG. 4 is a block diagram of the fuel level monitoring circuit.

The same decoder 160 shown in FIG. 4 is used to select the latch 322 and gate its outputs onto the bi-directional data bus 22. A 69 instruction selects the flow transducer port by providing a high Q1 output at the decoder 160 coupled by a 2-input NAND gate 406 with the high $\overline{MRD}$ output to provide the low activating input to the disable input of the latch 322 over lead 407. This gates the latch 322 output onto the data bus 22 and allows it to be entered in RAM 31 via microprocessor 30.

VEHICLE SPEED TRANSDUCER INPUT CIRCUIT

Figure 6:
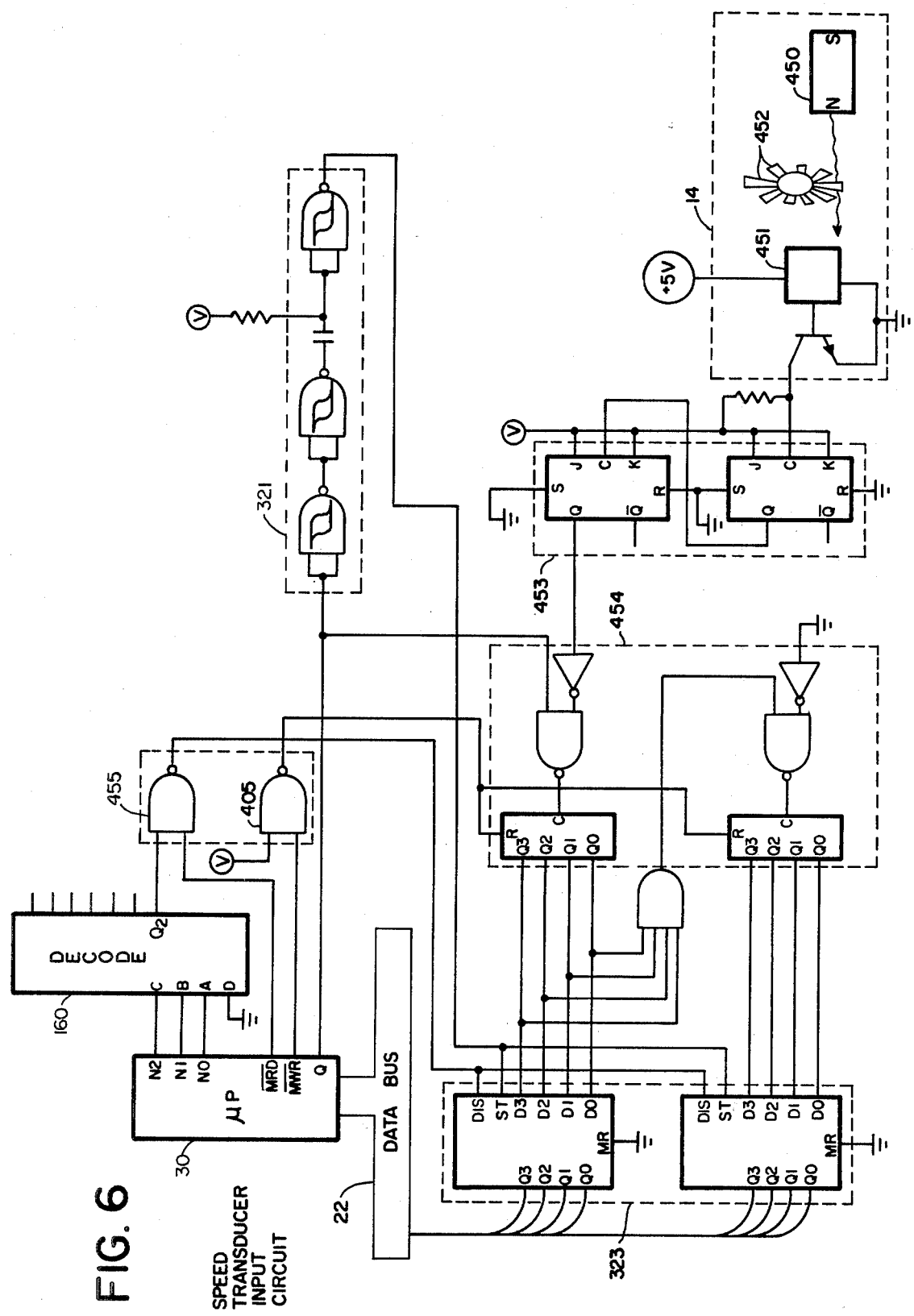
FIG. 6 is a block diagram of the speed transducer input circuit.

The transmission pickup 14 of FIG. 1 and its input circuitry is best seen in FIG. 6 and is very similar to the flow sensor input port shown on FIG. 5. Some peripheral control circuits are common to both. The sensor 14 itself consists of a Hall effect interrupter sensor consisting of a permanent magnet 450 and a Hall effect sensing integrated circuit 451. Interruption of the magnetic field with a high magnetic permeability material causes the Hall effect integrated circuit 451 to switch the output. Rotation of the vehicle drive shaft is sensed by placing a variety of equally spaced, high permeability blades 452 around the driveshaft and positioning the Hall effect sensor so that the rotation of the driveshaft causes the blades to pass between the magnet and the sensor thereby causing the output of the sensor 14 to toggle ON and OFF at a rate proportional to the driveshaft speed and hence proportional to the vehicle speed.

The output of the sensor 14 is preferably scaled so that the same count interval can be used for the transmission sensor 14 as for the flow sensor 13. The output of the sensor 14 is fed to a dual jk flip-flop which is wired as a symmetric divide by four register 453.

The output of the divide by four register is coupled to binary counter 454 identical to counter 315 of FIG. 4 and counter 402 FIG. 5. The enable and reset are controlled by the same logic as used for the flow sensor counter of FIG. 5 and the fuel monitor of FIG. 4. The output of the counter 454 is inputted to the microprocessor 30 by an identical latch 323 as used by the flow sensor 13, and fuel level monitor 15. The strobe input comes from the same monostable multivibrator 321 used by the flow sensor and fuel level monitor and all timing identical. The one difference is that the activating signal comes from Q2 terminal of the decoder 160 hence a 6A instruction selects the transmission pickup input port for reading into RAM 31 under control of the microprocessor 30. The same decoder 160 is used, but another 2-input nand gate 455 combines the device select line with the $\overline{MRD}$ output to differentiate between an input and an output instruction and to provide the low activating signal to the transmission pickup input port latch 323.

FUEL GAUGE MONITOR

The last input port to the system is the analog to digital convertor used to monitor the fuel gauge shown in wiring diagram form in FIG. 4

Referring now to FIG. 4, high impedance voltage divider 300 composed of the resistors 301 and 302 and a potentiometer 303 is connected across the sensor side of the vehicle fuel gauge to attenuate the fuel sensor voltage to a usable range of 0–7 volts for the circuitry following. A precision operational amplifier 304 is wired as a followr with the non-inverting input connected to the junction of the voltage divider 300 and the inverting input zero shifted the amount of the Zener diode 305, e.g. 1.65 volts. This produces an output of 1.65 volts to 8.65 volts at the output of the operational amplifier 304 for an input signal of 0 to 7 volts which is scaled down from the fuel gauge voltage of 0 to 12 volts. The attenuation and zero shifting of the fuel gauge voltage is necessary to provide the proper control voltage for the voltage controlled oscillator, VCO 306.

The VCO section of type MC14046BAL phase locked loop integrated circuit is used for the VCO 306. The pin numbers of the integrated circuit which are used are shown on the drawing. Frequency control resistors 310 and 311 and capacitor 312 are chosen to give a frequency of 128 Hz for a control voltage of 1.65 volts and the frequency output varies linearly with voltage to a maximum of 25 KHz for a control voltage of 8.65 volts. In order to make use of the same counting, input and timing circuitry developed for the flow transducer and transmission pickup described above, the VCO 306 output is preferably scaled.

In order to use an 8 bit counter and the same count interval as for the flow transducer and transmission pickup, the VCO 306 output must be divided by 100. To accomplish this, two decade counters 313 and 314 are used for two successive divide by 10 stages. The output of the decade counter 314 is thus the VCO output divided by 100.

The output of the divider stage 314 is fed to an 8 bit binary counter 315 identical to that used for the flow transducer and the transmission pickup. The timing and counter reset signals come from the same circuits as used by the other two counters via leads 321 and 317, respectively. The input port is again the dual 4 bit latch 320 identical to that used by the flow transducer and transmission pickup. The strobe circuitry 321 is the same as that used for the other two ports. The decoding by decoder circuit 160 for the port select is the same also with the exception that the Q3 output of the decoder circuit 160 is used this time. Therefore, a 6B instruction inputs the A to D data to the bi-directional data bus 22 to be inputted into RAM 31 of FIG. 1 by the microprocessor 30.

MANUAL INPUT CIRCUITRY

The first section of the manual input circuitry that will be discussed is the calibration data input control shown on FIG. 3. What is needed is a set of user operable switches which provide a 3 digit input (10's, 1's, and 1/10's) for entering calibration data and a single digit for control number input to signal the microprocessor 30 that relevant data is present or to guide the microprocessor 30 to a different part of the program. A means for transferring the data from the switches to an input port on command of the operator is needed.

The format preferred to accomplish this is four thumbwheel switches 170–173 constituting the CDIC switches of FIG. 1 configured to give BCD outputs for each switch position 0–9. Each switch uses 4 bits, therefore the input calibration data is in the 12 bit BCD format. A subroutine is used to change the BCD calibration data to a hexadecimal format. Since the control number uses a single BCD digit only 4 bits are used. Only numbers 0–9 are used as control numbers; and since 0–9 BCD is the same as 0–9 hex, no subroutine is needed to configure the control number. The thumbwheel switches are connected to tri-state latches 174–177 respectively.

When the operator is satisfied that the correct calibration data and control number are entered, he pushes a push buttom switch 179 and the data in the switches is strobed into the latches.

Figure 3:
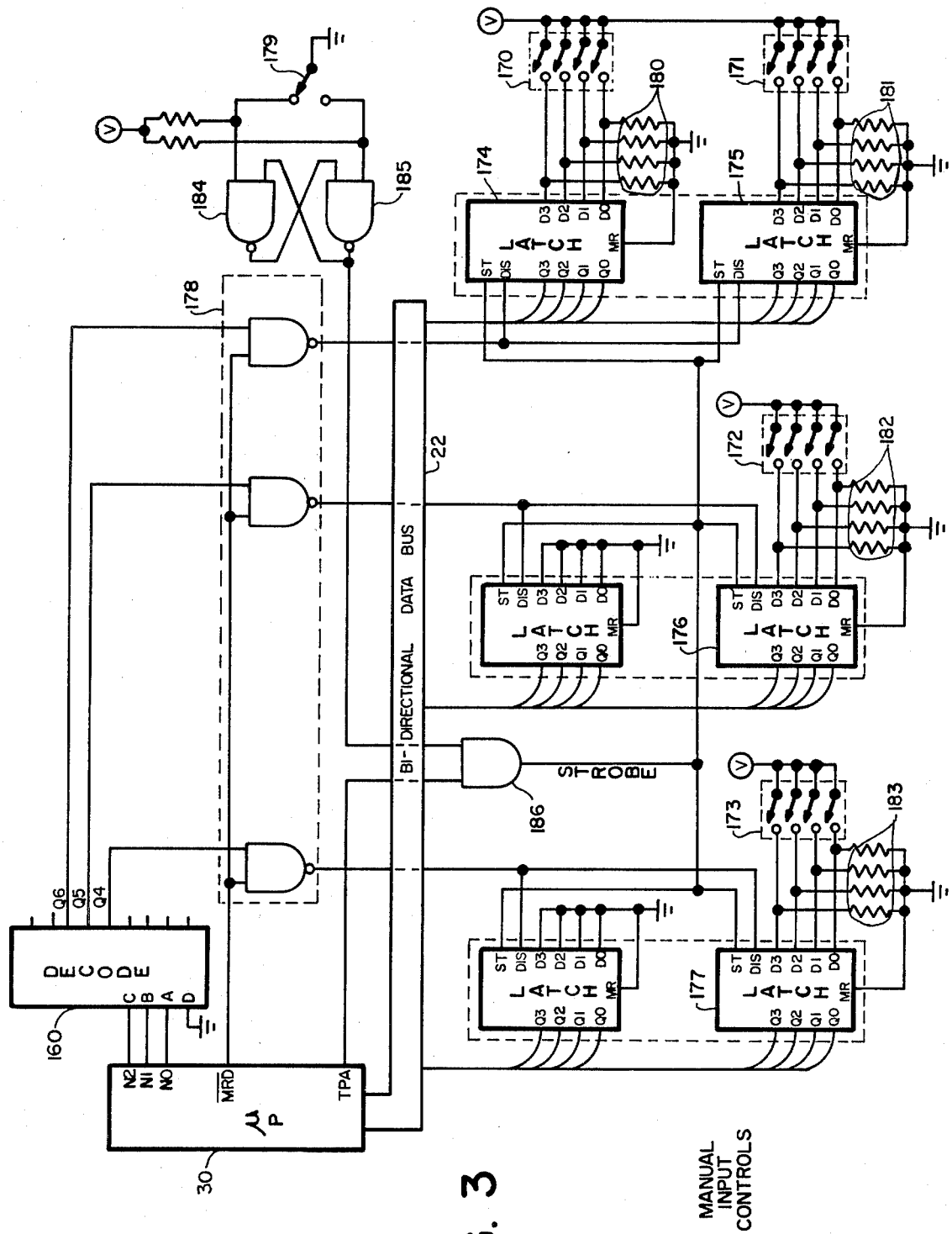
FIG. 3 is a block diagram of the manual input control circuit.

The wiring diagram of FIG. 3 is believed quite straight forward. The basic input port is formed from dual four-bit latches 174–177. The information input is controlled by thumbwheel switches 170–173 and pull-down resistors 180–183 coupled to the inputs of the latches. The thumbwheel switches 170–173 are configured in BCD notation. Each such thumbwheel switch has four switch connectors corresponding to 4 bits and a common. When a number is selected on the thumbwheel switch corresponding switch connections are switched to give the appropriate BCD code. Because the common line is connected to positive voltage, a closed switch contact produces a logic "1" and an open switch contact produces a logic "0" because the latch input is connected to ground through the pulldown resistors 180–183.

Since the bi-directional data bus 22 can handle 8 bits at a time, each port is arranged in 8 bits. The lower order 8 bits or byte of the calibration data input is controlled by thumbwheel switches 170 & 171. The higher order byte of the calibration data input is controlled by thumbwheel switch 172. Since calibraton data is entered as 12-bit numbers, the upper 4 bit inputs are grounded to insure that the upper 4 bits are zeros. Reading of the entire 12 bit data entry takes two successive input instructions. The directional code number is controlled by thumbwheel switch 173, and since the control code is only 4 bits, the upper most 4 bit inputs are grounded to insure that they are zeros. Reading the control code takes a single input instruction.

The data selected by the thumbwheel switches 170–173 is not transferred to the latches until switch 179, a double-pole single-throw momentary contact switch, is activated. This keeps intermediate settings of the thumbwheel switches from being inputted by the microprocessor 30 by accident. Switch 179 is protected from bounce errors by a monostable multivibrator formed by 2, 2-input NAND gates 184 and 185 and is coupled with the TPA output from microprocessor 30 by a 2-input AND gate 186 to form the strobe pulse to gate the switch information into the latches 174–177. The TPA pulse is chosen because its timing is correct to insure that new information is not gated into the latch during the input operation, only before or after. A monostable multivibrator is not needed since even the shortest duration of the switch by a finger push is still many TPA cycles long. All TPA pulses are properly timed and multiple strobes of the same input data are not harmful.

The particular input port to the microprocessor 30 is selected by Q4, Q5 and Q6 through the 3 bit binary to 8 output decoder 160. This is the same decoder used for output decoding for the 3 digital display device. It is not necessary to have two such decoders. The $\overline{MRD}$ output of the microprocessor 30 distinguishes between an input and an output instruction. On the output instruction $\overline{MRD}$ goes low but on an input instruction $\overline{MRD}$ stays high. Therefore, the 3, 2 input NAND gates 178 are used to decode the port signal output and $\overline{MRD}$ to provide a low activating signal to the proper port and gate the information onto the bidirectional data bus 22. A 6C instruction selects the direction code byte, a 6D instruction selects the high order byte of the calibration data and a 6E instruction selects the low order byte of calibration data.

MODE SELECTION

The final input circuitry to be considered is the mode selection circuitry. The method used involves the setting of flags. Flag 1 is used to indicate the calibration mode in both the single and three display embodiments. In the 3 display device, the absence of Flag 1 will indicate the operational mode. In the single display device, Flag 2 will indicate the miles-per-hour operational mode, Flag 3 will indicate the miles-per-gallon operational mode and the absence of any flags will indicate the MET operational mode. The wiring diagram for the 3 display device appears in FIG. 7.

Pull up resistors 330 hold the flag lines high which hold the flags in their "0" state. The mode select switch 324 is a single-pole, single-throw switch. When switch 324 is off, all flags are in their "0" state and the microprocessor is in the operational mode. When switch 324 is on, Flag 1 is held low putting Flag 1 in its "1" state. When Flag 1 is in its "1" state, the microprocessor 30 is in the calibration mode.

The mode selection wiring for the single display device is shown in FIG. 8. Switch 324 is the same switch, with the same function as for the 3 display device. when switch 324 is on, the microprocessor is in the calibration mode despite the condition of a switch 325 and Flag 1 is set in its "1" state. When switch 324 is off, switch 325 controls the mode selected. Switch 325 is a single-pole three-position switch. When switch 325 is in position "1", terminal EF2 is held low, Flag 2 is set and the microprocessor is in the miles-per-hour-mode, and it is assumed that switch 324 is off. When switch 325 is in position "2", the switch 324 is off, terminal EF3 is held low, Flag 3 is set and the microprocessor is in the miles-per-gallon mode. When switch 325 is in position "3" and switch 324 is off, no Flags are set and the microprocessor is in the Met mode.

DIP SWITCHES

Below is a list of the dip switches 33 used to input calibration data, identified by consecutive numbering and the calibration data stored in them. Also included in the list is the abbreviation which is used in the flowcharts. The dip switches 33 are accessed by the microprocessor 30 as memory locations.

DIP SWITCH TABLE

Dip switch 33

| Number | Abbreviation | Stored Calibration Data |
|---|---|---|
| 1 | DIPSW(1) | transmission pickup callibration constant |
| 2 | DIPSW(2) | A to D full tank output |
| 3 | DIPSW(3) | A to D ¾ tank output |
| 4 | DIPSW(4) | slope of line approximation between ¾ and full tank |
| 5 | DIPSW(5) | intercept of line approximation between ¾ and full tank |
| 6 | DIPSW(6) | A to D ½ tank output |
| 7 | DIPSW(7) | slope of line approximation between 178 and 182 tank |
| 8 | DIPSW(8) | intercept of line approximation between ½ and ¾ tank |
| 9 | DIPSW(9) | A to D ¼ tank output |
| 10 | DIPSW(10) | slope of line approximation between ¼ and ½ tank |
| 11 | DIPSW(11) | intercept of line approximation between ¼ and ½ tank |
| 12 | DIPSW(12) | A to D ⅛ tank output |
| 13 | DIPSW(13) | slope of line approximation between ⅛ and ¼ tank |
| 14 | DIPSW(14) | intercept of line approximation between ⅛ and ¼ tank |
| 15 | DIPSW(15) | slope of line approximation between empty and ⅛ tank. |

OUTPUT DEVICES

The next peripheral devices for the microprocessor 30 considered are the output devices. These consist of an 8 bit binary display 50, a 2 digit numeric display, 51 latching, buffering and decoding circuitry, all shown in FIG. 10. Microprocessor 30 outputs N0, N1 and N2 are used as I/O lead device select outputs and the state of $\overline{MRD}$ lead determines if the operation is an input operation or an output operation. Up to 3 input and 3 output devices can be operated with no additional decoding. Since, for the single numeric display device, 2 output devices and 3 input devices may be used, no additional decoding will be necessary. For the 3 display device, one 8 bit binary display and 3,2-digit numeric displays will be used with 3 input devices, therefore additional decoding is needed to select the 4 output devices.

The outputs N0, N1 and N2 are low until either an input or an output instruction is executed. Then the selected N output goes high. $\overline{MRD}$ goes low for an output instruction and high for an input instruction. Timing pulse TPB occurs when valid data is on the bidirectional data bus 22 and can be used to strobe the output data into the output device's latch. A 6 N instruction selects input or output. When N=1-7, an output instruction is indicated and N0, N1 and N2 become the same as the lower three bits of N. When N=9-F, an input instruction is indicated and N0, N1 and N2 are again the lower bits of N. Below is a table of N0, N1 and N2 outputs for all possible output instructions.

| OUTPUT INSTRUCTION | N0 | N1 | N2 |
|---|---|---|---|
| 61 | 1 | 0 | 0 |
| 62 | 0 | 1 | 0 |
| 63 | 1 | 1 | 0 |
| 64 | 0 | 0 | 1 |
| 65 | 1 | 0 | 1 |
| 66 | 0 | 1 | 1 |
| 67 | 1 | 1 | 1 |

It can be seen that to select 3 output devices without addition decoding N0 should be used to enable the first output device and a 61 instruction will access that device. N1 should be used to enable the second output device and a 62 instruction will access that device. N2 should be used to access the third output device and a 64 instruction will access that device. Hence for the single display device, N0 and N1 need only be used, N0 for the binary display (61) and N1 for the two digit numeric display (62). For the three display device, a 3-8 decoder 160 is used with outputs 1, 2, 3 and 4 being used to enable the binary display digital display 1, digital display 2 and digital display 3 respectively. The output instruction 61, 62, 63 and 64 would be used.

THREE DIGITAL DISPLAY

Figure 11:
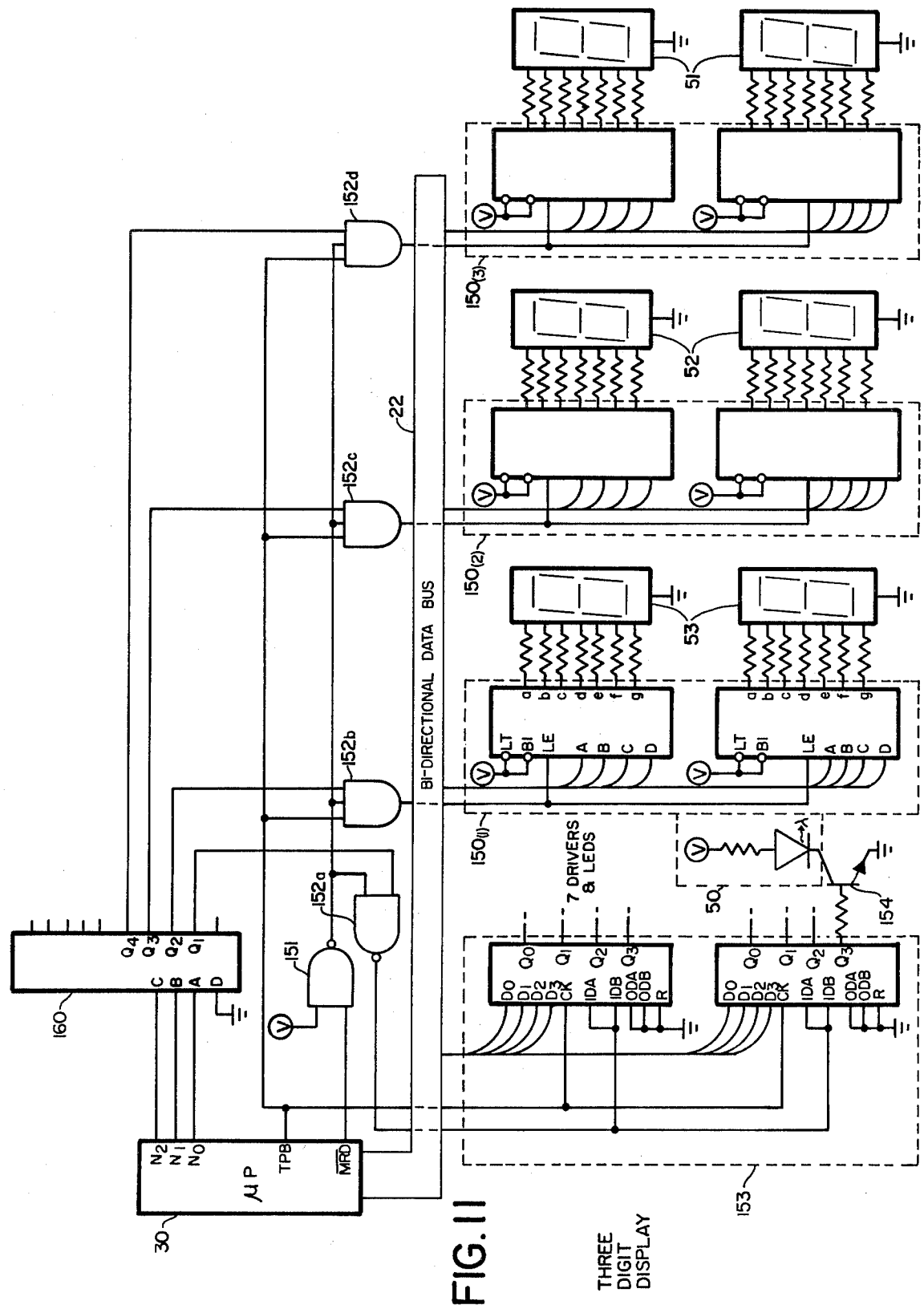
FIG. 11 is a block diagram of a three digit display circuit.
Figure 12A:
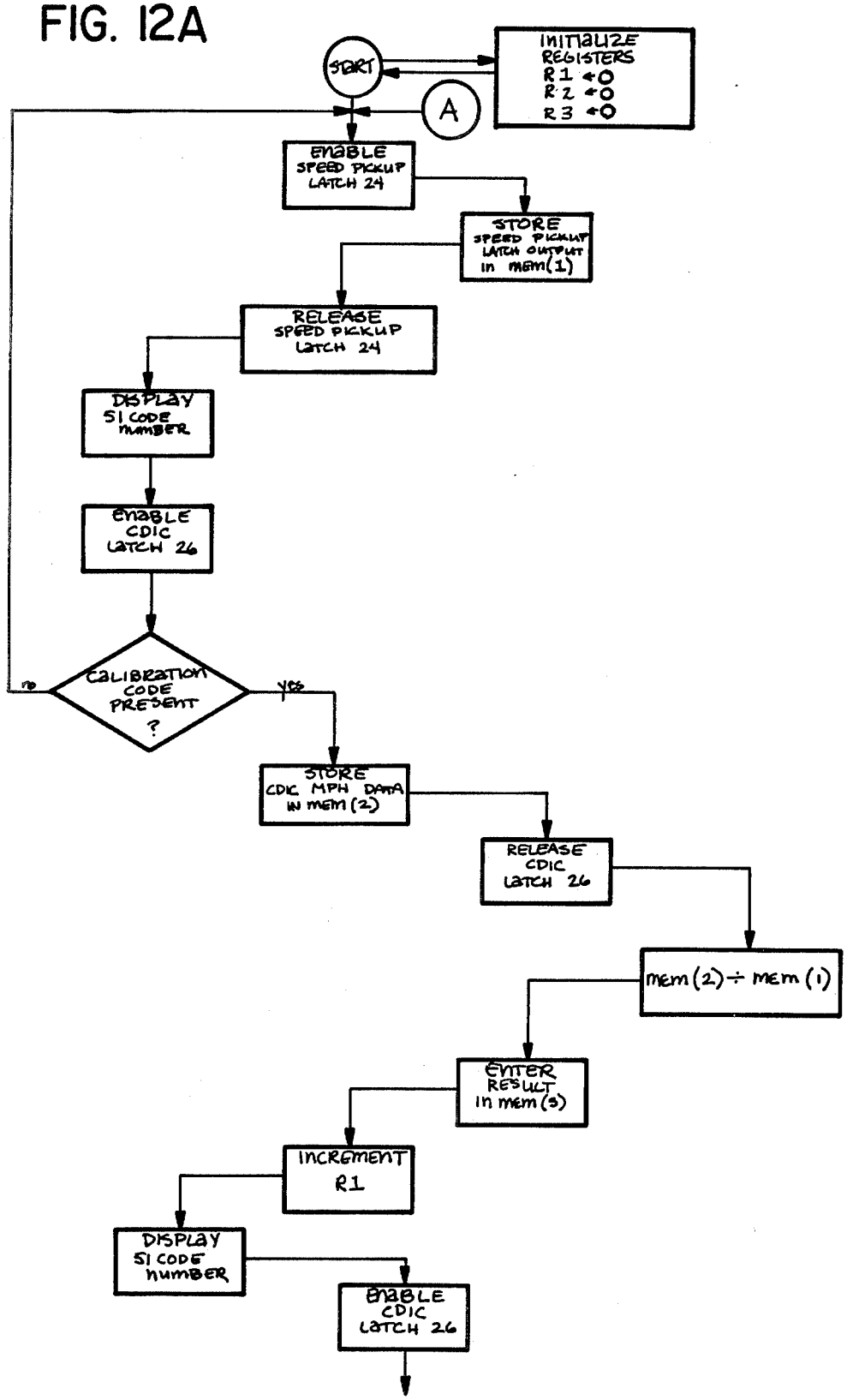
FIG. 12a-f constitutes the calibration flow chart of this invention.
Figure 12B:
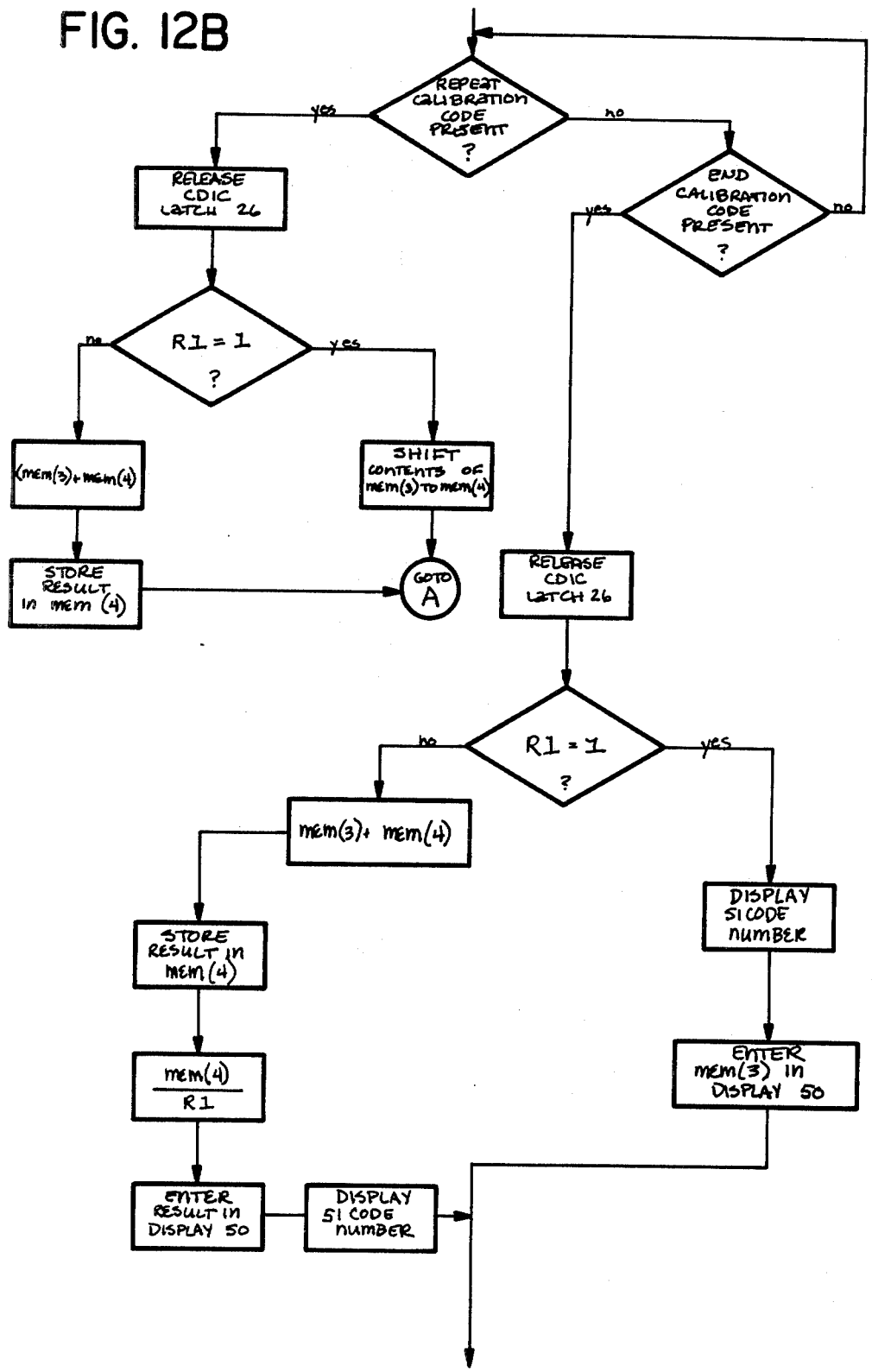
Figure 12C:
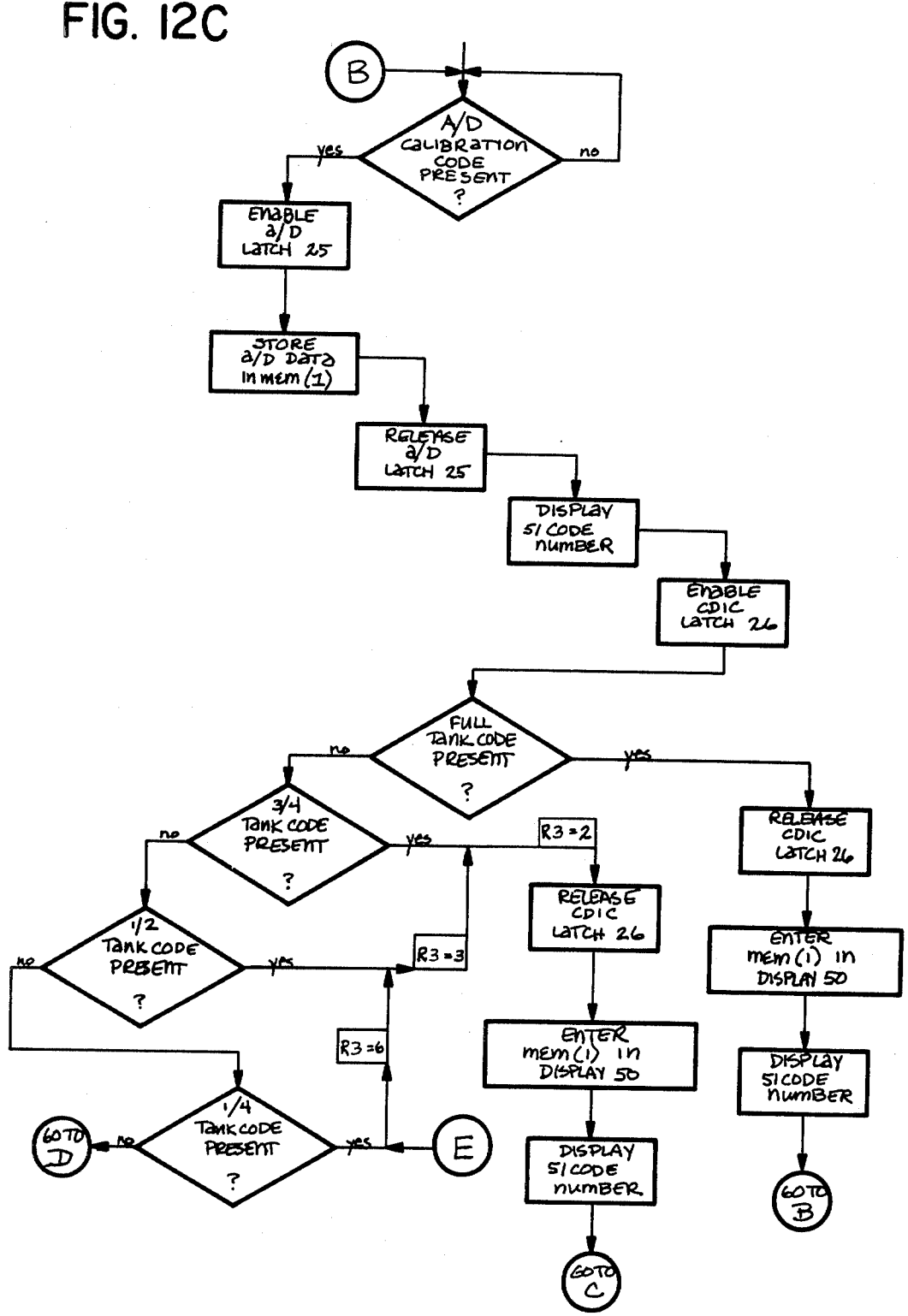
Figure 12D:
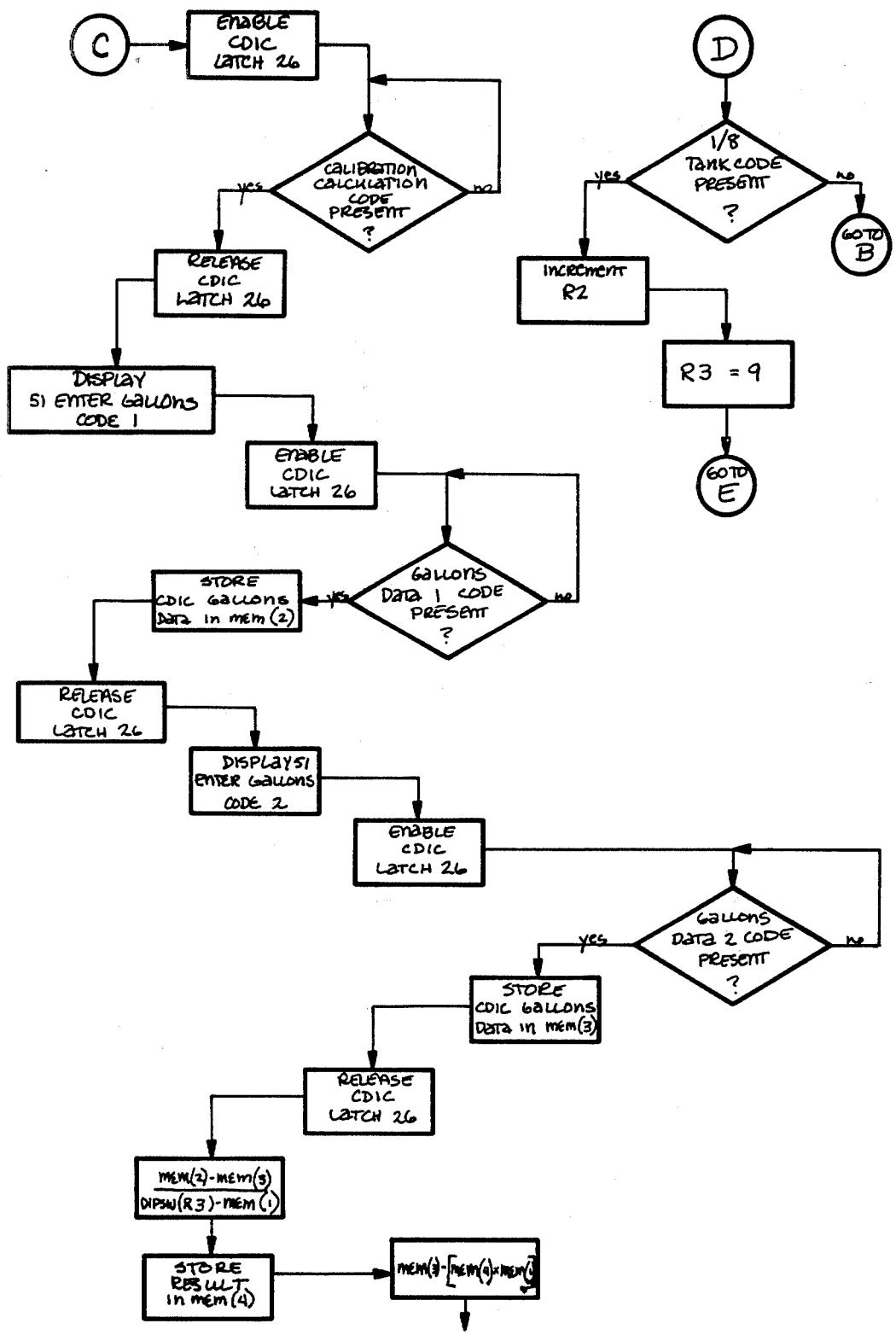
Figure 12E:
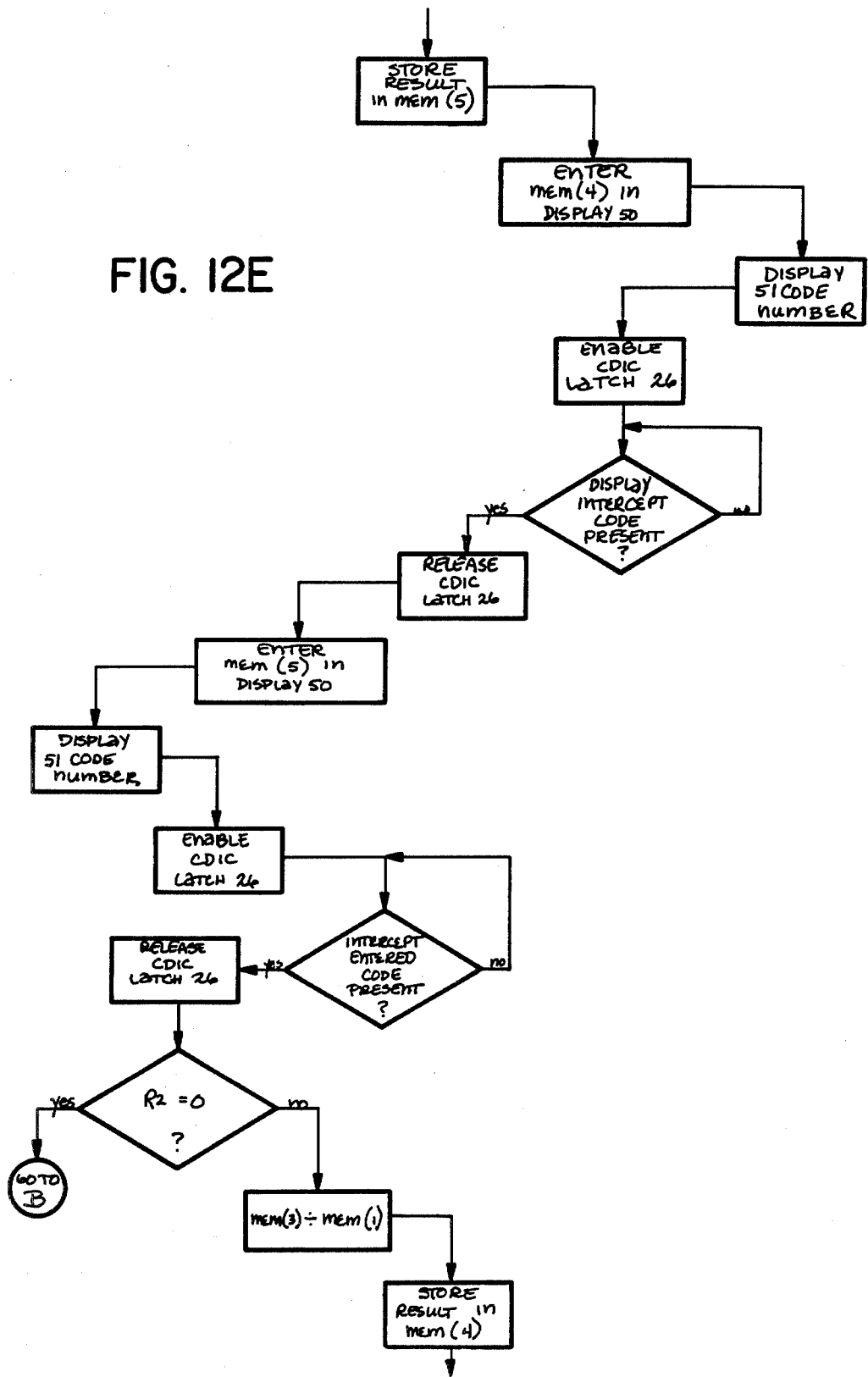
Figure 12F:
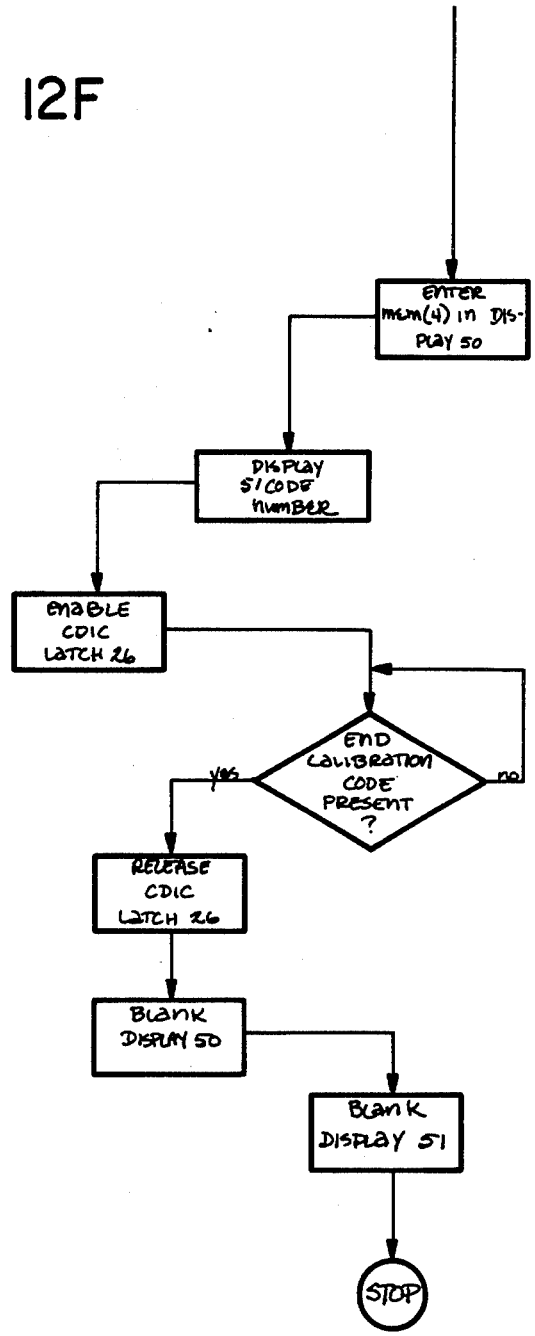

FIG. 11 shows the wiring diagram for the three digital display device. The latching and display drivers are the same as for the single digital display device with the exception that there are 3 digital displays instead of one. The main difference is in the decoding. The N0, N1 and N2 outputs are not used directly since there are more than three display devices. Therefore, an BCD-to-decimal decoder 160 is wired in a binary-to-octal (or 3 to 8) decoder configuration. For each possible combination of 1's and 0's at N0, N1 and N2, a unique output of the decoder 160 is chosen. In this case, the Q1 output is used with $\overline{\text{MRD}}$ to select the binary display, the Q2 output with $\overline{\text{MRD}}$ output is used to select the first digital display 150(1), the Q3 output of decoder 160 is used to select the second digital display 150(2) and the Q4 output is used to select the third digital display 150(3) with $\overline{\text{MRD}}$. In each case, the TPB pulse latches the data. The following shows the output instruction and the display enabled:

| Output instruction | Display chosen |
|---|---|
| 61 | binary |
| 62 | 1st digital |
| 63 | 2nd digital |
| 64 | 3rd digital |

Once again a BCD configuration sub-routine is used to prepare the output for the digital displays.

SINGLE DIGITAL AND LED DISPLAY

FIG. 10 shows the wiring diagram for the single digital display device. Two BCD-to-seven segment latch/decoder/drivers 150 A & B are used to drive dual seven segment displays 51. The microprocessor 30 operates in hexadecimal notation and therefore a sub-routine has to be used to convert the number to be displayed from hexadecimal to binary-coded decimal (BCD) notation before outputting to the latch/decoder/driver 150. One latch/decoder/driver 150a is connected to the lower 4 bits of the bi-directional data bus, and the other 150b is connected to the upper 4 bits. The $\overline{\text{MRD}}$ output of microprocessor 30 is inverted using a NAND gate 151 as an inverter and decoded using a 3 input AND gate 156 along with the NI output and TPB to select the digital display when a 62 instruction is executed and the output data latched in the display by the TPB pulse. FIG. 10 shows a common cathode LED display 51 being used, but the circuitry is capable of driving an incandescent, fluorescent, gas discharge, common anode LED or liquid crystal display if desired.

The binary display used in calibration needs no configuring sub-routine since it is intended to read out in hexadecimal (HEX), bit by bit. Two quad D-type registers 153 are used to latch the output data. External driver transistors 154 are used to drive 8 LEDS. Again, one register 152a, latches the lower four bits of the bi-directional data bus while the other register 152b, latches the upper 4 bits. The inverted $\overline{\text{MRD}}$ output on lead 155 and the N0 outputs are decoded using a NAND gate 152 to enable the latch inputs when a 61 instruction is executed. The data present at the bi-directional data bus 22 is latched by the TPB pulse and displayed by the LEDs-ON for "1" and OFF for "0".

VEHICLE SYSTEM INTEGRATION

The final design factors considered are the power supply value, clock frequency, automatic reset at power-up and the status of the control inputs and input/output request inputs.

First, since most vehicles operate on a 12 volt electrical system and since the higher the supply voltage, the higher the noise immunity of the circuit which is important in an environment as noisy as a motor vehicle, a power supply equaling 10 volts is preferred to be used. This gives a 2 volt margin from the maximum which the preferred microprocessor unit, type CDP1802D and peripheral circuits can sustain, and it allows regulation and filtering of the power supply. The high supply voltage also has the added benefit that a high clock frequency and short cycle time can be used.

From integrated circuit specifications information, the maximum clock frequency which should be used with Vdd=10 VDC is 6.5 MHz at 25° centigrade. The maximum frequency must be derated by 0.35%/° centigrade over 25° centigrade. Since a motor vehicle is a hostile environment for temperature, a maximum clock frequency is chosen for the maximum operating temperature of the microprocessor 30 which is 125° centigrade, therefore the 125° centigrade maximum frequency must be reduced by 35%; hence, a maximum clock frequency of 4 MHz is recommended to be used. Since an average machine cycle is 16 clock periods long, an average machine cycle will take 3.8 microseconds.

The control inputs are $\overline{\text{WAIT}}$ and $\overline{\text{CLEAR}}$. They select four internal modes of operation of the microprocessor, program load, reset, pause and run. Since all programming will have been done and entered in ROM 32 to be executed starting at the program counter setting of zero, the conventional LOAD mode will never be activated. The reset mode establishes the internal register R(O) as program counter and sets it to zero. To insure proper running of the program when power is applied, circuitry must be provided to provide a momentary reset control instruction. The RUN mode will then be activated after reset and the program will be executed.

The input/output I/O requests are $\overline{\text{DMA-IN}}$, $\overline{\text{DMA-OUT}}$ and $\overline{\text{INTERRUPT}}$ or direct memory access in or out and interrupt. The input and output ports of the vehicle performance analyzer have been designed simply enough that none of the nomral Input/Output requests are needed.

FIG. 9 shows the implementation of the above discussion.

In FIG. 9, it can be seen that the $\overline{\text{WAIT}}$ input of microprocessor 30 is held high by a pull up resistor 507. When power is applied the $\overline{\text{WAIT}}$ input is held high and capacitor 501 on the $\overline{\text{CLEAR}}$ input pulls it low. A low on the $\overline{\text{CLEAR}}$ and a high on the $\overline{\text{WAIT}}$ inputs puts the microprocessor 30 into the RESET mode establishing the internal register R(0) of microprocessor 30 as the program counter and setting it to zero. The capacitor 501 charges through resistor 502 until it reaches voltage V where it will stay until power is turned off. When the capacitor 501 reaches voltage V, $\overline{\text{CLEAR}}$ is high. A high on both the $\overline{\text{CLEAR}}$ and $\overline{\text{WAIT}}$ inputs puts the microprocessor 30 in the RUN mode and the program from step zero is executed. The duration of the RESET is about four machine cycles, thus each time power is applied, the microprocessor 30 is automatically reset.

The $\overline{\text{DMA-IN}}$, $\overline{\text{DMA-OUT}}$ and $\overline{\text{INTERRUPT}}$ inputs are also held high by pull up resistors 508, 509 and 510 respectively. Holding these inputs high puts them in their non-active state and allows the program to run normally.

A 4 MHz crystal 503 and appropriate biasing resistor 504 and capacitors 505 and 506 for the clock timing circuitry are shown in FIG. 9. The values are as per manufacturer's data. It can also be seen that 8 pullup resistors 500 are shown on the bi-directional data bus 22. This is suggested by manufacturer to put the data bus in a known state when it is not being used, thereby reducing noise.

It should be noted that all pull-up or pull-down resistors shown on all previous figures have values of 47 k ohms unless otherwise specified. Current limiting resistors for the light emitting diodes used in the binary display and the digital displays depend on the type used. For must general light emitting diodes and light emitting diode displays, a value of 430Ω should be used. For the light emitting diode buffer transistors, any NPN transistors with $V_{eb} > 12$ volts, $I_c > 40$ ma. and an $H_{fe} \geq 120$ may be used. Depending on the transistor, a base resistor of $\approx 50$ kΩ should be used. This completes the preferred circuit design for the VEHICLE PERFORMANCE ANALYZER.

CALIBRATION

One method for storing the calibration constants is to burn them into proms. Proms and the prom programmer may however be replaced by coded banks of bit switches, such as dip switch 33 of FIG. 2, e.g. (switches mounted in an integrated circuit). For each calibration constant which comprises 1 byte (8 bits) of memory a single dip switch having 8 individual contacts is used. One position of each switch is wired to present a logic "0" and the other position would present a logic "1". These switches are gated to the data bus 22 through an address latch which is coded to the memory address port of the microprocessor 30. Thus when the program called for a calibration constant, the code for that constant is loaded into the memory address port, the appropriate dip switch 33 is selected, and the number, previously set on the switch in binary, would appear on the data bus.

This method has several advantages. The number of constants to be stored is small, namely 15. The smallest proms are usually 256 bytes. Thus most of the prom is unused. The prom programmer circuit would be eliminated along with the need for higher voltage (30 v) power supplies for program burning. Any mistakes in calibration could easily be redone and corrected. Recalibration, if the device were changed to another vehicle, would be no problem. The problem of starting the calibration program in the correct place after power-down would be eliminated, because no data could be rewritten or destroyed and using the CDIC switch 16, the program could be steered to the correct place and calibration resumed.

Instead of burning the calibration constants into proms, the constant is outputted in the binary display; and the operator enters the correct number from the display by selecting the correct I's and O's of the particular dip switch 33.

The final calibration flow-chart covers the following method of calibration:

(1) The operator will select the calibration mode with the CDIC 16.

(2) The microprocessor 30 will calibrate the transmission pickup first.

(3) The operator will drive at some constant speed.

(4) The microprocessor will transfer the number generated by the transmission pickup to a memory register.

(5) The microprocessor 30 will then output a code number in the digital display 51 which will indicate to the operator that steps 2 through 4 have been done.

(6) The operator will then enter the speed in miles-per-hour on the CDIC 16 and also a code number signifying that the microprocessor 30 should calculate the calibration constant.

(7) The microprocessor 30 inputs the data on the CDIC 16, calculates the calibration constant, and outputs a code number on the digital display 51 signifying step 7 has been done.

(8) The operator can repeat steps 2 through 7 as many times and at as many speeds as wanted by entering the appropriate code on the CDIC 16 after step 7.

(9) When the operator is satisfied that enough calibration cycles have been completed, another code is entered on the CDIC 16 and all the calibration constants will be averaged by the microprocessor to produce the final calibration constant.

(10) The microprocessor 30 will then output a code number in the digital display 51 showing that calibration is complete, then the calibration constant will be read out on a binary display 50 on the circuit board which contains the dip switches 33. This binary display 50 will show lighted LED's (light emitting diodes) for logic "1's" and unlighted LED's for logic "0's".

(11) The operator will then copy the calibration constant into the appropriate dip switch 33 by selecting "1's" and "0's" on the switch position identical to the binary readout.

(12) The operator then enters another code number to signify to the microprocessor 30 that it should go to the part of the program that handles the calibration of the fuel gauge A to D (analog-to-digital converter) unit.

(13) The operator will fill his fuel tank and enter a code number on the CDIC 16 to signal the microprocessor 30 to sample the A to D unit 15.

(14) The microprocessor 30 will sample the data output of the A to D unit 15, output a code number telling the operator that sampling is complete, and output the A to D number on the binary calibration display 50.

(15) The microprocessor will then wait for the next directing.

(16) The operator will then enter the binary number in step 14 into the appropriate dip switch 33, so that, if the unit is powered down before the next calibration input, the number in step 14 would not be lost.

(17) The operator would then deplete the fuel tank to ¾ of a tank as shown on fuel gauge and enter a code number on the CDIC 16 to signal the microprocessor 30 to sample the A to D unit 15.

(18) The microprocessor 30 will then sample the A to D unit 15, output a code number signifying that sampling is complete, and enter the A to D number on the binary calibration display 50.

(19) The operator will enter the number in step 18 into the appropriate dip switch 33, and enter a code number on the CDIC 16 telling the microprocessor that step 19 has been done.

(20) The microprocessor outputs a code number in the digital display 51 which asks for the number of gallons of fuel in a full tank.

(21) The operator enters the number of gallons and an appropriate code number on the CDIC 16.

(22) The microprocessor enters the number on the CDIC 16 in a memory register and displays another code number asking for the number of gallons of fuel in $\frac{3}{4}$ of a tank.

(23) The operator enters the number of gallons and an appropriate code number on the CDIC 16.

(24) The microprocessor 30 enters the number of gallons into a memory register, calculates the slope and intercept of a straight line approximation relating actual gallons to A to D output, outputs a code number in the digital display 51, and outputs the slope on the binary calibration output display 50.

(25) The operator enters the slope on the appropriate dip switch 33 and enters a code number on the CDIC 16.

(26) The microprocessor 30 outputs a code number in the display and outputs the intercept number on the binary calibration display 50.

(27) The operator enters the intercept number in the appropriate dip switch 33.

(28) The operator then depletes the fuel tank to $\frac{1}{2}$ of a tank as shown on the fuel gauge and enters a code number on the CDIC 16.

(29) The microprocessor 30 samples the A to D, outputs a code number on the display, and outputs the A to D number on the binary calibration output 50.

(30) The operator enters the A to D number on the appropriate dip switch 33 and enters a code number on the CDIC 16.

(31) The microprocessor 30 outputs a code number asking for the number of gallons in $\frac{1}{2}$ of a tank.

(32) The operator enters the number of gallons and a code number on the CDIC 16.

(33) The microprocessor enters the number of gallons into a memory register, calculates the slope and intercept for a straight line approximation relating actual gallons to A to D output for A to D outputs between $\frac{1}{2}$ and $\frac{3}{4}$ of a tank, outputs a code number in the digital display 51, and outputs the slope on the binary calibration output display 50.

(34) The operator enters the slope on the appropriate dip switch 33 and enters a code number on the CDIC 16.

(35) The microprocessor 30 displays a code number on display 51 and outputs the intercept on the binary calibration output display 50.

(36) The operator enters the intercept on the appropriate dip switch 33.

(37) The operator then depletes the fuel tank to $\frac{1}{4}$ of a tank and enters a code number on the CDIC 16.

(38) The microprocessor 30 samples the A to D unit 15, outputs a code number on the display 51, and outputs the A to D number on the binary calibration display 50.

(39) The operator enters the A to D number on the appropriate dip switch 33 and enters a code number on the CDIC 16.

(40) The microprocessor 30 outputs a code number asking for the number of gallons in $\frac{1}{4}$ of a tank.

(41) The operator enters the number of gallons in $\frac{1}{4}$ of a tank and a code number of the CDIC 16.

(42) The microprocessor 30 enters the number of gallons into a memory register, calculates the slope and intercept for a straight line approximation relating actual gallons to A to D output for A to D output between $\frac{1}{4}$ to $\frac{1}{2}$ of a tank, outputs a code number on the display 51, and outputs the slope on the binary calibration display 50.

(43) The operator enters the slope on the appropriate dip switch 33 and enters a code number on the CDIC 16.

(44) The microprocessor 30 displays a code number on display 51 and outputs the intercept on the binary calibration display 50.

(45) The operator enters the intercept on the appropriate dip switch 33.

(46) The operator then depletes the fuel tank to $\frac{1}{8}$ of a tank and enters a code number on the CDIC 16.

(47) The microprocessor 30 samples the A to D, outputs a code number on the display 51, and outputs the A to D number on the binary calibration display 50.

(48) The operator enters the A to D number on the appropriate dip switch 33 and enters a code number on the CDIC 16.

(49) The microprocessor 30 outputs a code number asking for the number of gallons in $\frac{1}{8}$ of a tank.

(50) The operator enters the number of gallons in $\frac{1}{8}$ of a tank and a code number on the CDIC 16.

(51) The microprocessor 30 enters the number of gallons in a memory register, calculates the slope and intercept for a straight line approximation relating actual gallons of A to D outputs between the $\frac{1}{8}$ and $\frac{1}{4}$ of a tank, outputs a code number on the display 51 and outputs the slope on the binary calibration display 50.

(52) The operator enters the slope on the appropriate dip switch 33 and enters a code number on the CDIC 16.

(53) The microprocessor 30 displays a code number and outputs the intercept on the binary calibration display 50.

(54) The operator enters the intercept of the appropriate dip switch 33 and enters a code number on the CDIC 16.

(55) The microprocessor 30 calculates the slope of a straight line approximation relating actual gallons to A to D output going from the origin (o,o) to $\frac{1}{8}$ of a tank, displays a code number, and outputs the slope on the binary calibration output display 50.

(56) The operator enters the slope on the appropriate dip switch 33 and the calibration is completed.

Note that the non-linear calibration method is used for the A to D unit 15. This was chosen to compensate for electrical non-linearities in the vehicle electrical gauging system and non-linearities in the mechanical sensing system.

OPERATIONAL PROCEDURE

Figure 13:
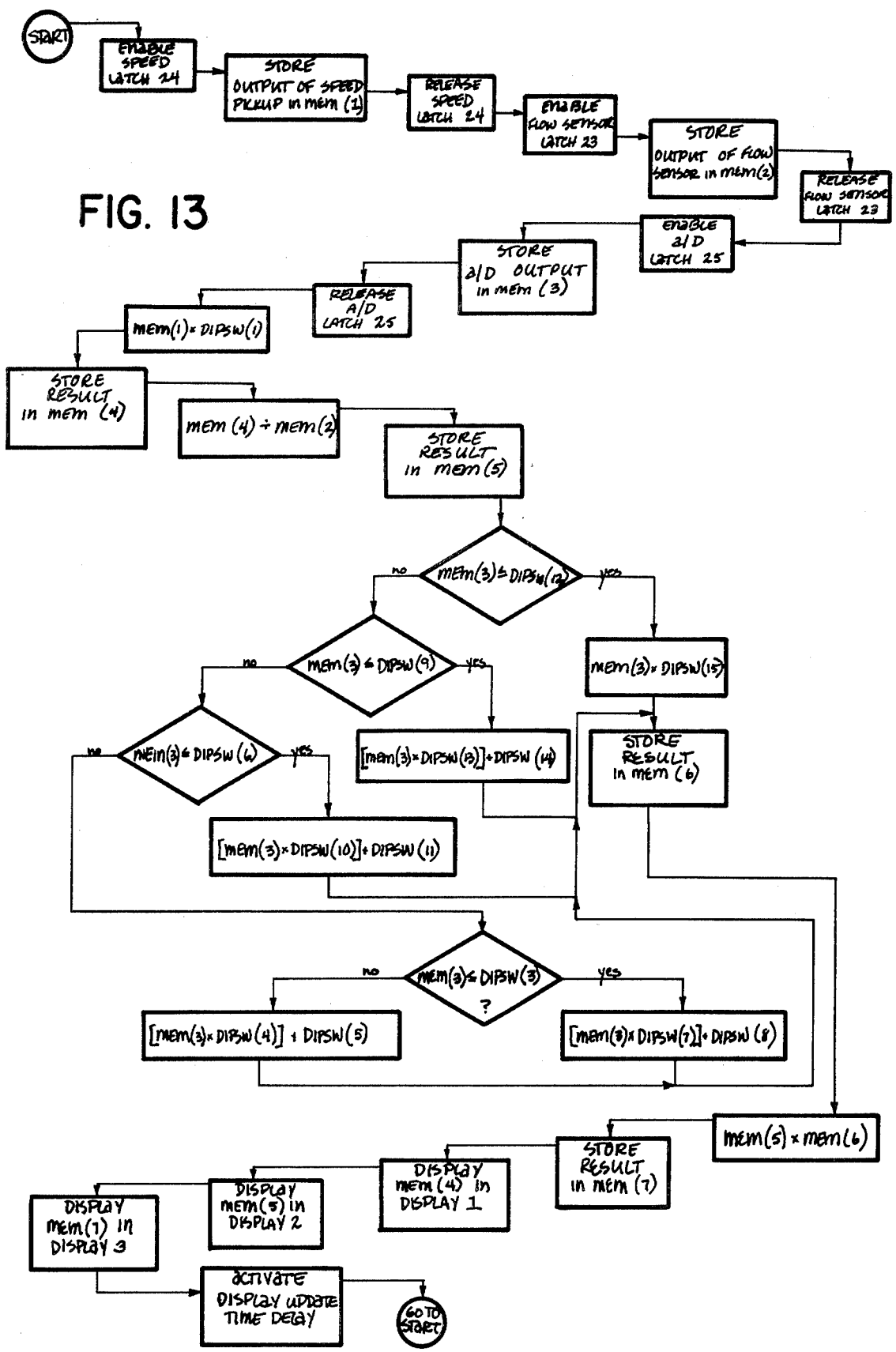
FIG. 13 is a flow diagram for the operational mode of this invention when employing three displays.

The operation mode flow chart FIG. 13 is developed in two parts. One covers the device with only one display and selection among miles-per-hour (MPH), miles-per-gallon (MPG) and miles-to-end-of-tank (MET) operation modes. The other part will cover the device with three displays which will perform and display all three modes continuously.

In the operational flow chart for three display device the following abbreviations are used: Disp-1, Disp-2 and Disp-3 wil be used to signify the first, second and third displays 51, 52 and 53 respectively. Disp-1 wil be used to display MPH, Disp-2 will be used to display MPG and Disp-3 will be used to display MET.

The operation of the three display device is as follows:

1. The microprocessor 30 accesses the transmission pickup 14 and stores the output in memory location MEM(1).

2. The microprocessor 30 then accesses the flow sensor 13 and stores the output in memory location MEM(2).

3. The microprocessor 30 then accesses the A to D unit 15 and stores the output in a third memory location MEM(3).

4. The microprocessor then takes the stored output of the transmission pickup and multiplies it by the calibration constant stored in the dipswitch 1 thereby converting the transmission pickup output to actual MPH.

5. The result of 4 above is then stored in a memory MEM(4) register by the microprocessor 30.

6. The microprocessor 30 then takes the stored MPH value and divides it by the flow sensor output which is designed to readout directly in gallons-per-hour, thereby calculating MPG.

7. The result of 6 above is stored at the MEM(5) memory location of microprocessor 30.

8. The microprocessor 30 then compares the stored A to D output with the A to D output values for ⅛, ¼, ½ and ¾ and full tank stored in DIP switches 2, 3, 6, 9 and 12 to determine which of the 5 straight line approximations is to be used to convert the A to D output to actual gallons.

9. When it is determined between which limits the A to D value lies, the microprocessor 30 multiplies the A to D value by the correct slope stored in a DIP switch 33 and adds the appropriate intercept (if any) which is also stored in a DIP switch 33.

10. The result of 9 above is the actual gallons of fuel in the tank.

11. The microprocessor 30 then multiplies the result of 9. above by the result of 6 above which is miles-to-the-end-of-tank (MET).

12. The result of 11 above is stored at yet another memory location of microprocessor 30.

13. The microprocessor 30 then consecutively reads out of the memory MPH and displays it in Disp-1, MPG and displays it in Disp-2 and MET and displays it in Disp-3.

14. The values in the displays are latched until the next update by the microprocessor 30.

15. The microprocessor 30 then activates a time delay, either a program loop or an external timer, to keep the display from being refreshed too fast for the eye to distinguish the values.

16. At the end of the time delay the microprocessor 30 goes back to the beginning of the program and repeats the operational steps.

Figure 14:
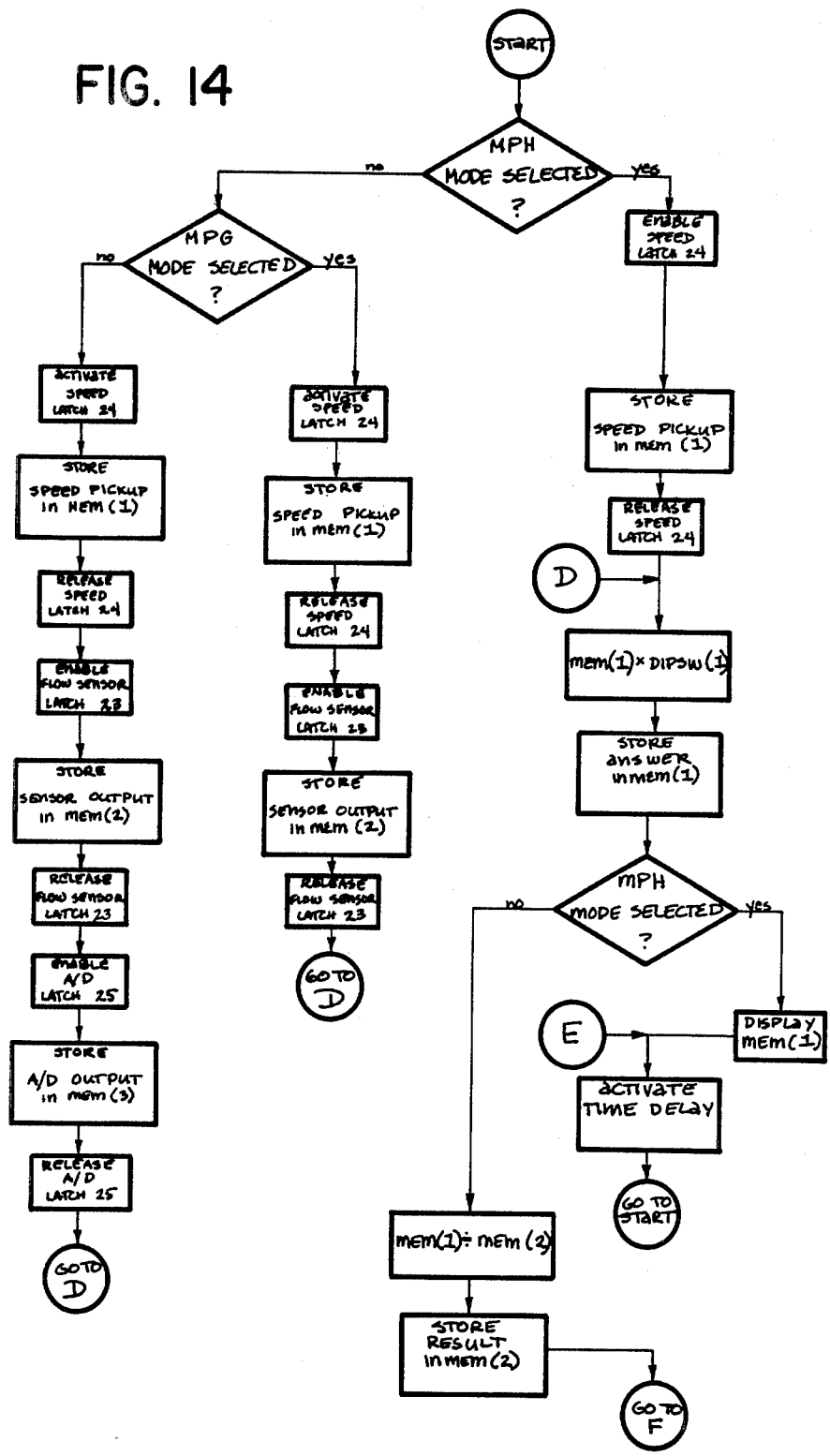
FIG. 14 is a flow diagram for the calculation and display of miles per hour.

Operational procedure flow chart for single display device system appears in the flow chart, FIG. 14

A. MPH Mode (FIG. 14)

1. The MPH mode is selected with the mode switch 320 and the microprocessor 30 detects the mode selected.

2. The microprocessor 320 accesses the transmission pickup register 21 and stores the output in a memory register MEM(1).

3. The microprocessor 30 then multiplies the transmission pickup output of the calibration constant stored in DIP switch 1, 33, thereby converting the transmission pickup output to actual MPH.

4. The microprocessor 30 then stores the result of 3 above in a memory register MEM(2).

5. The microprocessor 30 then displays the contents of the memory register of 4 above in the single display 51 where it is latched until the microprocessor 30 updates the output.

6. The microprocessor 30 then activates the display update time delay, either via program loop or through the use of an external timer.

7. At the end of the time delay, the microprocessor 30 repeats the operation steps until either a different mode is selected or the device is powered down.

Figure 15:
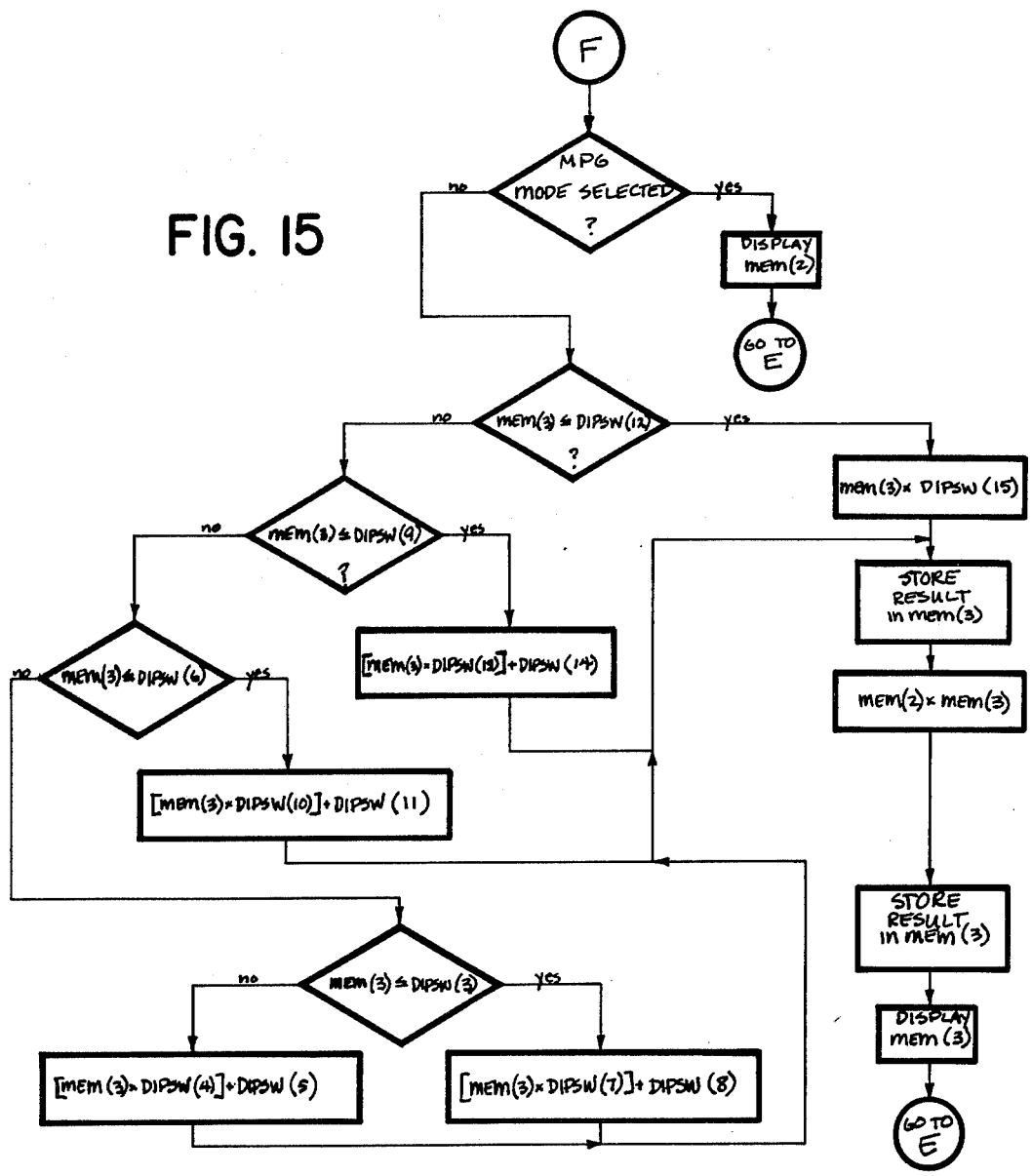
FIG. 15 is a flow diagram for the calculation and display of miles per gallon of fuel consumption.

B. MPG Mode (FIGS. 14, 15)

1. The MPG mode is selected with the mode switch 320 and the microprocessor 30 senses the mode selected.

2. The microprocessor 30 accesses the speed or transmission pickup register and stores the output in a memory register MEM(1).

3. The microprocessor 30 then accesses the flow sensor and register 20 and stores its output in another memory register MEM(2).

4. The microprocessor 30 then multiplies the transmission pickup output by the calibration constant contained in the DIP switch 1, 33, thereby converting the transmission pickup output to actual MPH.

5. The result of 4 above is then stored in MEM(1) memory register by the microprocessor 30.

6. The microprocessor 30 then divides the MPH value by the output of the flow sensor register 20 which is designed to readout directly in gallons-per-hour.

7. The result of 6 above is MPG and is stored in MEM(2) memory register by the microprocessor 30.

8. The microprocessor 30 then enters the stored MPG value in the single digital display 51, where it is latched until the microprocessor 30 updates the display.

9. The microprocessor then activates the display update time delay.

10. At the end of the time delay, the microprocessor 30 repeats the operational steps until another mode is selected or until the unit is powered down.

C. MET Mode (FIGS. 14, 15)

1. The MET mode is selected with the mode switch 320 and the microprocessor 30 detects the mode selected.

2. The microprocessor 30 accesses the transmission pickup register 21 and stores the output in a memory register MEM(1).

3. The microprocessor 30 then accesses the flow sensor register 20 and stores the output in another memory register MEM(2). 4. The microprocessor 30 then accesses the A to D converter 15 and stores the output in yet another memory register MEM(3).

5. The microprocessor 30 multiplies the output of the transmission pickup by the calibration constant contained in DIP switch 1, 33, thereby converting the transmission pickup output to MPH.

6. The microprocessor stores the result of 5 above in a memory register MEM(1).

7. The microprocessor 30 divides the MPH value of 5 above by the flow sensor output, which is designed to readout directly in gallons-per-hour, thereby calculating MPG.

8. The microprocessor 30 stores the result of 7 above in a memory register MEM(2).

9. The microprocessor then compares the stored A to D output with the A to D outputs for ⅛, ¼, ½, ¾ and full tank stored in DIP switches 12, 9, 6, 3 and 2 respectively to determine which of the 5 straight line approximations will be used to convert the A to D output to actual gallons.

10. When it is determined between which limits the A to D value lies, the microprocessor 30 multiplies the A to D value by the correct slope stored in a DIP switch 33 and adds the appropriate intercept (if any) which is also stored in a DIP switch.

11. The result of 10 above is the actual gallons of fuel in the tank.

12. The result of 10 above is then stored by the microprocessor 30 in a memory register MEM(3).

13. The microprocessor 30 then multiplies the stored MPG value by the stored value of gallons of fuel, thereby calculating MET.

14. The result of 13 above is stored in a memory register MEM(3).

15. The stored MET value is then entered by the microprocessor 30 in the single display 51 where it is latched until the microprocessor 30 updates the display.

16. The microprocessor 30 then activates the display update time delay.

17. At the end of the time delay, the microprocessor 30 repeats the operational steps until another mode is selected or the device is powered down.

Figure 16:
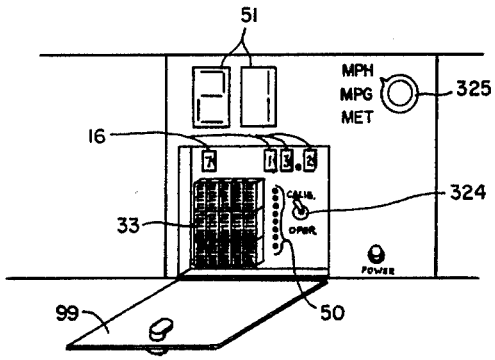
FIG. 16 is a fragmentary front elevational view of an automobile dash panel incorporating this invention.

A pictorial representation of a typical automotive dash panel incorporating a single display embodiment of this invention appears in FIG. 16. The series of fifteen eight position dipswitches 33, such switches holding one byte (8 bits) and the LED binary display 50 used for calibration may be seen. The CDIC thumbwheel switches 16 are shown with an arbitrary setting of 7 denoting a code 7 and 13.2 as calibration input data. A power switch, POWER, for turning this invention on and off appears at the lower right. The mode selector switch 324 for establishing calibration or operational mode as well as the three positions, function selector switch 325 for selecting miles per hour, miles per gallon or miles to end of tank, appear in FIG. 16. The data and instruction display 51 completes the panel array. The CDIC switches 16, dipswitches 33, LED display 50 and mode selection switch are all normally concealed behind a door 99 to avoid inadvertant changing of calibration constants.

SUMMARY

This invention provides an on board computer for calculating and displaying three basic indicators of vehicle performance and particularly the miles to the end of the fuel supply. Of great significance is the fact that the system is calibrated by the user to the actual vehicle on which it is installed and the calibration overcomes the non-linearities in the existing sensors, fuel and speed of the vehicle, thus giving the user an actual correct readout based upon independent observed data. For example, a fuel tank may be rated as having a capacity of 20 gallons but in actuality it may vary ±5%. Fuel gauges are notoriously inaccurate, sometimes registering a half tank when only one-third tank remains. Speedometers often exhibit errors of ±5% from actual values. Employing this invention the user calibrates the system by filling the tank to full capacity and entering the full code via the dipswitches 33. After driving until the fuel gauge reads three-quarters full, he then enters the three-quarters full input and so on. The system calculates the slope of the fuel usage curve and thereafter, until changed, displays data in accordance with the observed inputs registered. The user may also drive at a variety of speeds observed either at highway speedometer check zones or in a shop calibrator and actually calibrate the system to provide an accurate readout of vehicle speed on display 51 with far greater accuracy than the normal vehicle speedometer. He may similarly drive to the end of tank for purposes of providing an accurate calibration of distance to end of tank. Thereafter, the system, when switched to the operational mode, provides for the user meaningful and correct vehicle performance information heretofore not available. If vehicle performance changes, e.g. different size tires are installed, the system may be recalibrated by the user. If the user changes automobiles, the system may easily be removed and installed and calibrated in the replacement vehicle.

The above described embodiments of this invention are merely descriptive of its principles and are not to be considered limiting. The scope of the invention instead shall be determined from the scope of the following claims including their equivalents.

What is claimed is:

1. A user calibratable vehicle performance system comprising:
   a plurality of on-board sensing means including speed measuring means for generating a digital representation of the instantaneous vehicle speed;
   flow measuring means for generating a digital representation of the instantaneous fuel consumption of the vehicle;
   fuel gauge means for generating a digital representation of the amount of fuel remaining in the vehicle fuel supply;
   digital computer means responsive to the output of said speed measuring means, said flow measuring means and said fuel gauge means for computing instantaneous miles per gallon of fuel consumption and miles to the end of the vehicle fuel supply;
   and manually operated calibration means coupled to said computer means for inputting actual data observed by the user at a series of sets of conditions;
   said manually operated calibration means including manually controlled means for introducing into said digital computer observed data in numerical form;
   said digital computer responding to said sensing means and the numerical input for generating and displaying a binary signal representative of the calibration constant to be stored in the memory of said digital computer;
   said manually operated calibration means including a plurality of user operated binary switches for matching the display to input calibration data to the memory of said computer.
   said computer means thereafter operative to calculate vehicle performance as a function of said calibration values.

2. The combination in accordance with claim 1 including mode select means for allowing the input of calibration data by said manual calibration means only when said mode select means is in a calibration mode.

3. The combination in accordance with claim 2 wherein said mode select means includes a position for operation wherein said computer means calculates performance of said vehicle employing the calibration constants last inputted and when said mode select means was in the calibration mode.

4. A vehicle performance monitoring system comprising:
on-board sensing means for measuring the following parameters:
(a) fuel flow;
(b) fuel quantity;
(c) vehicle speed
digital computing means coupled to said on-board sensing means for computing the following quantities from parameters measured by said on-board sensing means;
(d) instaneous fuel consumption rate; and
(e) instaneous distance to end of fuel supply;
said computing means including a plurality of manually controlled switches inputting in numerical form actual desired performance data;
said computer responding to the numerical inputted data for calculating correction factors for said parameters
binary display means for displaying corrective factors as computed by said computing means;
binary switch means operable by the user to match the binary display means;
said binary switch means coupled to the memory of said computer to store correction factors therein;
said numerical display means for displaying vehicle performance parameters as calculated and corrected by said computer means.

5. The combination in accordance with claim 4 wherein said system includes means for sensing vehicle speed coupled to said computer means whereby said system may display vehicle speed.

6. The combination in accordance with claim 4 wherein said display means comprises a single display and including a selector switch for selecting which parameter is to be displayed coupled to said computer means.

7. The combination in accordance with claim 4 wherein said display means comprises a plurality of displays, one for each quantity calculated by said computer means.

8. The combination in accordance with claim 4 including mode select means for selecting either an operating or a calibrate mode of operation wherein said computer means is operative when said mode select means is in a calibrate mode to receive actual input observed parameters from said manually controlled switches;
said computer means being operative when in a calibrate mode as determined by said mode select means to calculate a correction factor for parameters as measured by said on-board sensing means as a function of said input data from said manually controlled switches;
said computer means being operative when in an operating mode as determined by said mode selecting means to compute and transmit to said display means corrected value of said quantities.

9. The combination in accordance with claim 4 wherein said computer means calculates instantaneous slope of the value of the quantities as said correction factors.

10. A vehicle performance system comprising;
speed measuring means for generating a digital representation of the instantaneous vehicle speed;
flow measuring means for generating a digital representation of the instantaneous fuel consumption;
fuel gauge means for generating a digital representation of the amount of fuel remaining in the fuel tank;
digital computer means responsive to the outputs of said speed measuring means, said flow measuring means and said fuel gauge means for computing instantaneous miles per gallon and miles to end of tank; and
decimal digit display means for selectively displaying said miles per gallon and miles to end of tank and calibration input commands;
wherein said computer means further includes
a set of data input switches settable by the vehicle user to produce a digital representation of the actual observed values corresponding to said above outputs to allow said computer to compute correction factors to be applied to said outputs;
said computer means including a non-volatile programmable memory for storing said correction factors;
binary display means coupled to said computer means for displaying the required input to said non-volatile memory to store the required correction therein; and
a second set of user operated switches for introducing the required input to said non-volatile memory by matching said display.

11. The combination in accordance with claim 10 including selector switch means including a miles per hour position coupled to said computer means whereby corrected vehicle speed may be displayed.

12. The combination in accordance with claim 11 wherein said selector switch includes a miles per gallon setting wherein said computer means is operative to produce a digital representation of the actual instantaneous fuel consumption rate.

13. The combination in accordance with claim 10 wherein said second user operated switches need only be operated to match said binary display to input correct data for storage in said non-volatile memory.

14. The combination in accordance with claim 10 wherein said second set of user operated switches have two positions corresponding to respective binary display conditions.

15. The combination in accordance with claim 14 wherein said decimal digit display means is controlled by said computer means when in a calibration mode to display numerically encoded instructions for said user.

16. A vehicle performance system for use with a vehicle having a fuel gauge and vehicle speed measuring apparatus, a fuel supply and an engine comprising:
first sensor means coupled to said fuel gauge for developing an electrical signal related to the representation of fuel quantity appearing on said gauge;
second sensor for developing an electrical signal representative of fuel flow from the fuel supply to the engine of the vehicle;
a third sensor for producing an electrical signal representation of fuel flow from the fuel supply to the engine of the vehicle;
means for converting the signals generated by said first, second and third sensors into digital form;

a plurality of manual controls for introducing calibration signal input representing in digital numerical form for each parameter to be displayed by said system from actual observed data;

a central computing unit including memory means coupled to said converting means and said manual control for receiving signal inputs therefrom;

means for selecting a mode of operation of said system including the two following modes:
(a) calibrate
(b) operate;

said central computing unit programmed to calculate at least miles per gallon of fuel consumption and miles to end of tank;

means for displaying the results of the calculations of said central computing unit as determined by said mode select means; and means responsive to the input of actual observed data for changing the calibration of said system;

said last means including said computer and a second display coupled thereto for indicating to the user the calibration required based upon the calibration input by said manual controls and a second set of manual controls for use by the user for introducing said calibration changes into the memory of said computer.

17. The combination in accordance with claim 16 wherein said central computing unit is programmed to divide the speed as sensed by said speed sensor by the quantity of fuel as sensed by said fuel flow sensor;

whereby said system may display miles per gallon.

18. The combination in accordance with claim 16 wherein said central computing unit multiplies fuel quantity by fuel consumption rate as determined by the quotient of speed and fuel flow;

whereby said system may display miles to empty tank.

19. The combination in accordance with claim 16 wherein said manual controls are operative to introduce into the memory of said central processing unit data with respect to at least one of the following parameters; vehicle speed, fuel flow, and meter gas gauge as a function of actual independent observed conditions.

20. A vehicle performance system comprising:
(a) means for sensing vehicle speed;
(b) means for sensing the flow rate of fuel to the engine of said vehicle;
(c) means for sensing the quantity of fuel in the fuel supply of said vehicle;
(d) means for converting the values sensed by each of the foregoing sensing means into digital form;
(e) a central computing unit for performing arithmetical calculations on the digitized values as sensed by said sensing means and including non-volatile memory for holding calibration constants for said calculations;
(f) function switch means for selecting the calculation to be performed;
(g) a plurality of manual calibration input means accessible to the user for introducing actual observed data into said central computing unit as said vehicle is in operation;
(h) display means for displaying the output for said central computer unit in digital form;
(i) means within said computer for varying the arithmetical determination based upon the calibration from said manual calibration input means; and
(j) binary display means controlled by said central computing unit for displaying required non-volatile calibration data and a plurality of binary manually controlled input means coupled to the memory of said central computing unit for introducing non-volatile calibration into said memory.

21. The combination in accordance with claim 20 including manual input means for registering calibration input data in numerical form;

said central processing unit including means for encoding input data from said manual input means in binary form and for combining said binary form calibration input data with information from said sensors to produce calibration constants and for displaying calibration constant data on said binary display whereby the user may store such input data in binary form by matching said binary display by said plurality of manual calibration input means.

22. The combination in accordance with claim 20 wherein said central computing unit is coupled to said digital display to display thereon user commands when said mode selection means is in a calibration mode.

23. The combination in accordance with claim 20 wherein said central computing unit includes:
memory means for storing calibration data therein.

24. The combination in accordance with claim 21 including second memory means coupled to said sensing means for storing sensed vehicle parameters therein;
said last memory coupled to said digital display and including function switch means for selecting the function to be displayed on said display.

25. The combination in accordance with claim 20 including a plurality of digital displays, one for each function to be displayed and means coupling the output of said central computing unit determining each parameter to be displayed to a respective digital display.

* * * * *